United States Patent
Sahm et al.

(10) Patent No.: US 12,448,960 B2
(45) Date of Patent: Oct. 21, 2025

(54) REDUCED SIZE FLUID TRANSFER AND DEPRESSURIZATION APPARATUS, CONTROL, AND ASSOCIATED METHODS

(71) Applicant: TPE MIDSTREAM LLC, Tulsa, OK (US)

(72) Inventors: Douglas A. Sahm, Lutz, FL (US); Carson Depew, Tulsa, OK (US)

(73) Assignee: TPE MIDSTREAM LLC, Tulsa, OK (US)

( * ) Notice: Subject to any disclaimer, the term of this patent is extended or adjusted under 35 U.S.C. 154(b) by 0 days.

(21) Appl. No.: 18/254,557

(22) PCT Filed: Dec. 29, 2021

(86) PCT No.: PCT/US2021/065527
§ 371 (c)(1),
(2) Date: May 25, 2023

(87) PCT Pub. No.: WO2022/147136
PCT Pub. Date: Jul. 7, 2022

(65) Prior Publication Data
US 2024/0011512 A1     Jan. 11, 2024

Related U.S. Application Data

(60) Provisional application No. 63/250,567, filed on Sep. 30, 2021, provisional application No. 63/132,215, filed on Dec. 30, 2020.

(51) Int. Cl.
*F04B 39/12*     (2006.01)
*F04B 9/12*     (2006.01)
(Continued)

(52) U.S. Cl.
CPC .............. *F04B 39/123* (2013.01); *F04B 9/12* (2013.01); *F04B 35/01* (2013.01); *F04B 35/04* (2013.01);
(Continued)

(58) Field of Classification Search
CPC ............. F04B 9/025; F04B 9/113; F04B 9/12
(Continued)

(56) References Cited

U.S. PATENT DOCUMENTS 3,776,665 A    12/1973   Dalton
4,653,986 A     3/1987   Ashton
(Continued)

FOREIGN PATENT DOCUMENTS

CA        2473077 C     10/2006
CN      108930648 A    12/2018
(Continued)

OTHER PUBLICATIONS

Australian Government, IP Australia, "Patent Examination Report No. 1," issued in connection with Australian Patent Application No. 2021411963, issued on Jun. 1, 2024, 5 pages.
(Continued)

*Primary Examiner* — Kenneth J Hansen
(74) *Attorney, Agent, or Firm* — Hanley, Flight & Zimmerman, LLC

(57) ABSTRACT

An apparatus to compress a fluid is disclosed herein. The example apparatus includes a casing, an actuation cylinder and a compression cylinder defined in the casing, a rod slidably coupled between the actuation cylinder and the compression cylinder, and a piston coupled to the rod at an end of the rod, the end of the rod in the compression cylinder, the piston slidable relative to the compression cylinder to compress the fluid therein.

17 Claims, 14 Drawing Sheets

(51) Int. Cl.
| | |
|---|---|
| F04B 35/01 | (2006.01) |
| F04B 35/04 | (2006.01) |
| F04B 49/06 | (2006.01) |
| F15B 15/04 | (2006.01) |
| F15B 15/14 | (2006.01) |
| F15B 15/20 | (2006.01) |
| F15B 15/28 | (2006.01) |

(52) U.S. Cl.
CPC .............. *F04B 49/06* (2013.01); *F15B 15/04* (2013.01); *F15B 15/1447* (2013.01); *F15B 15/202* (2013.01); *F15B 15/2807* (2013.01); *F15B 2215/30* (2013.01)

(58) Field of Classification Search
USPC .................................................. 417/403, 404
See application file for complete search history.

(56) References Cited

U.S. PATENT DOCUMENTS

| | | | | |
|---|---|---|---|---|
| 5,147,182 | A * | 9/1992 | Timmons | F04B 43/113 |
| | | | | 417/234 |
| 10,443,586 | B1 * | 10/2019 | Sahm | F04B 49/08 |
| 10,443,590 | B1 * | 10/2019 | McCoy | F15B 15/1461 |
| 2019/0195213 | A1 | 6/2019 | Burrows | |

FOREIGN PATENT DOCUMENTS

| | | |
|---|---|---|
| CN | 109944768 A | 6/2019 |
| CN | 111075693 A | 4/2020 |
| WO | 2012107480 A1 | 8/2012 |
| WO | 2022147136 A1 | 7/2022 |

OTHER PUBLICATIONS

United Kingdom Intellectual Property Office, "Examination Report under section 18(3)," issued in connection with United Kingdom Patent Application No. 2309601.9, dated Jun. 28, 2024, 2 pages.

Australian Government, IP Australia, "Examination report No. 2," issued in connection with Australian Patent Application No. 2021411963, dated Sep. 11, 2024, 4 pages.

International Searching Authority, "Written Opinion," issued in connection with International Patent Application No. PCT/US2021/065527, mailed on Apr. 20, 2022, 5 pages.

International Searching Authority, "International Search Report," issued in connection with International Patent Application No. PCT/US2021/065527, mailed on Apr. 20, 2022, 4 pages.

International Searching Authority, "International Preliminary Report on Patentability," issued in connection with International Patent Application No. PCT/US2021/065527, issued on Jul. 4, 2023, 7 pages.

Saudi Authority for Intellectual Property, "Substantive Examination Report," issued in connection with Saudi Patent Application No. 523441462, dated Dec. 13, 2023, 12 pages. [English Machine Translation Included].

Canadian Intellectual Property Office, "Examiner requisition," issued in connection with Canadian Patent Application No. 3,202,903, dated Oct. 21, 2024, 4 pages.

United Kingdom Patent Office, "Patents Act 1977: Examination Report under Section 18(3)," issued in connection with United Kingdom Patent Application No. 2309601.9, dated Nov. 28, 2024, 2 pages.

Australian Government, IP Australia, "Notice of Acceptance," issued in connection with AU Application No. 2021411963, issued on Dec. 13, 2024, 4 pages.

United Kingdom Patent Office, "Patents Act 1977: Search under Section 17," issued in connection with United Kingdom Patent Application No. GB2503542.9, dated Mar. 31, 2025, 4 pages.

United Kingdom Intellectual Property Office, "Notification of Grant," issued in connection with United Kingdom Patent Application No. 2309601.9, dated Apr. 1, 2025, 2 pages.

European Patent Office, "Extended European Search Report," issued in connection with EP Application No. 21916423.3, mailed on Jan. 9, 2025, 10 pages.

United Kingdom Intellectual Property Office, "Intention to Grant," issued in connection with GB Application No. GB2309601.9, mailed on Feb. 13, 2025, 2 pages.

Saudi Authority for Intellectual Property, "2nd Examination Report," issued in connection with PCT National Phase Application No. 523441462, dated Jul. 29, 2025, 8 pages. [English Machine Translation Included].

* cited by examiner

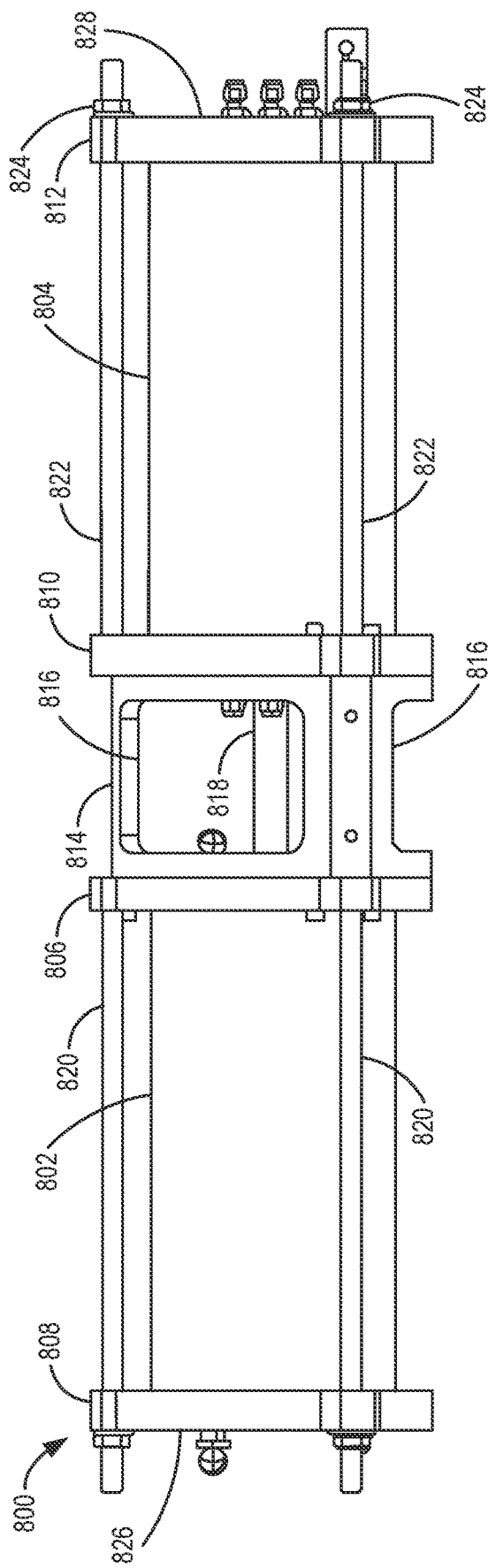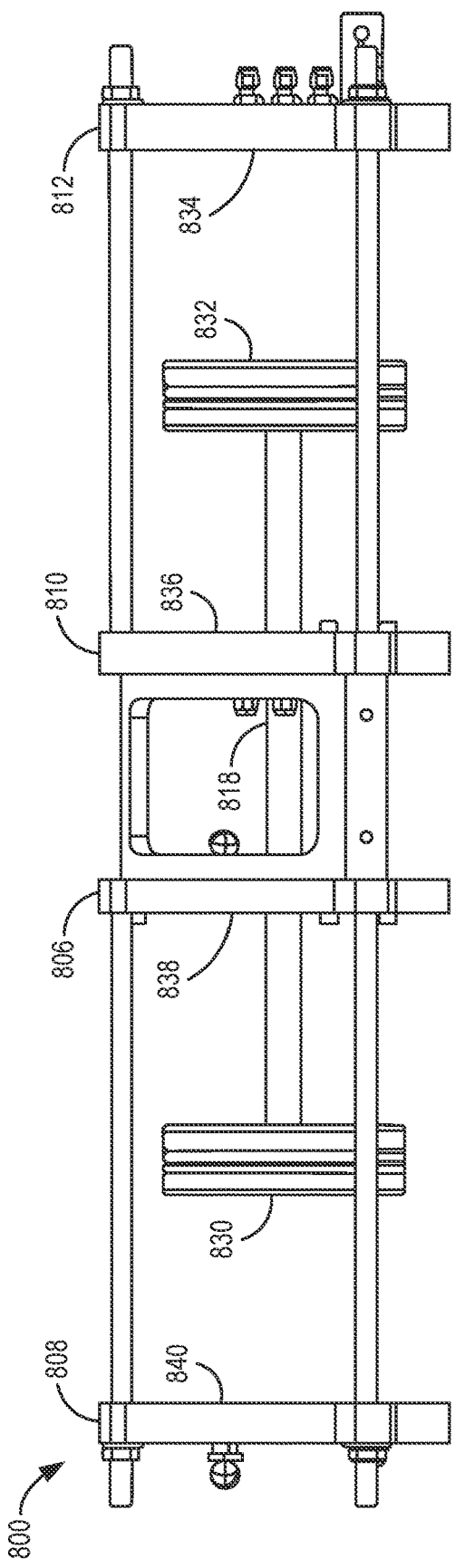

REDUCED SIZE FLUID TRANSFER AND DEPRESSURIZATION APPARATUS, CONTROL, AND ASSOCIATED METHODS

RELATED APPLICATIONS

This patent arises from a U.S. National Stage Patent Application under U.S.C. 371 of PCT Patent Application No. PCT/US21/65527, titled "Reduced Size Fluid Transfer and Depressurization Apparatus, Control, and Associated Methods," filed Dec. 29, 2021, which claims priority to U.S. Provisional Application No. 63/132,215," titled "Reduced Size Fluid Transfer and Depressurization Apparatus, Control, and Associated Methods," filed Dec. 30, 2020, and U.S. Provisional Application No. 63/250,567, titled "Reduced Size Fluid Transfer and Depressurization Apparatus, Control, and Associated Methods," filed Sep. 30, 2021. PCT Patent Application No. PCT/US21/65527, U.S. Provisional Application No. 63/132,215 and U.S. Provisional Application No. 63/250,567 are hereby incorporated by reference in their entireties.

FIELD OF THE DISCLOSURE

This disclosure relates generally to compressors and, more particularly, to reduced size fluid transfer and depressurization apparatus, control, and associated methods.

BACKGROUND

Compressors can be used to transport a fluid between two or more locations. When the fluid is a gas, the compressors can increase pressure of the fluid while decreasing volume of the fluid. Multiple compressors can be used to achieve a desired pressure of the fluid.

BRIEF DESCRIPTION OF THE DRAWINGS

FIG. 8A illustrates an example two-cylinder compressor including example air and gas casings.

FIG. 8B illustrates the example two-cylinder compressor of FIG. 8A with the example air and gas casings removed.

Figure 1:
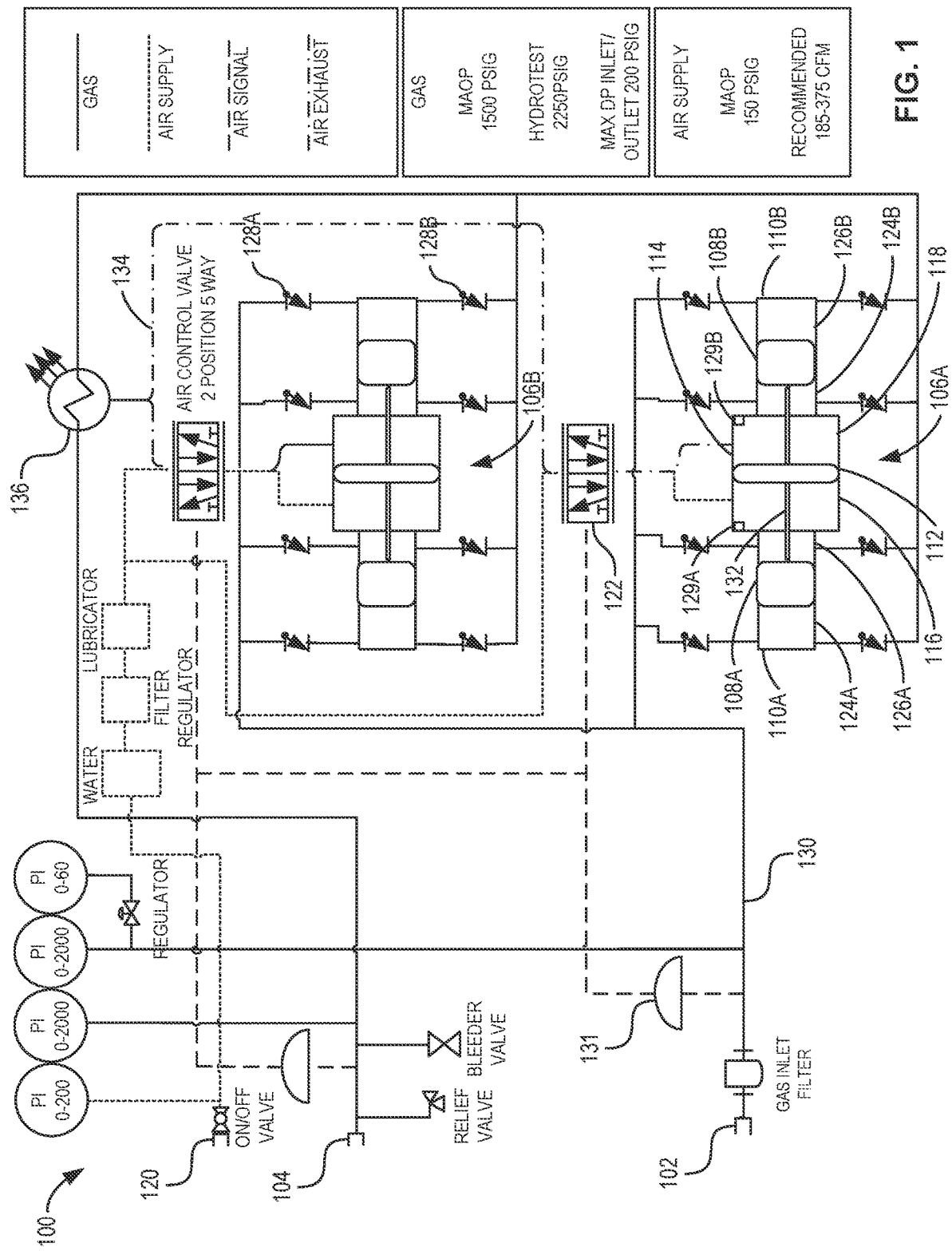
FIG. 1 is a schematic illustration of an example fluid transfer and depressurization system.

The figures are not to scale. Instead, the thickness of the layers or regions may be enlarged in the drawings. In general, the same reference numbers will be used throughout the drawing(s) and accompanying written description to refer to the same or like parts. As used in this patent, stating that any part (e.g., a layer, film, area, region, or plate) is in any way on (e.g., positioned on, located on, disposed on, or formed on, etc.) another part, indicates that the referenced part is either in contact with the other part, or that the referenced part is above the other part with one or more intermediate part(s) located therebetween. Connection references (e.g., attached, coupled, connected, and joined) are to be construed broadly and may include intermediate members between a collection of elements and relative movement between elements unless otherwise indicated. As such, connection references do not necessarily infer that two elements are directly connected and in fixed relation to each other. Stating that any part is in "contact" with another part means that there is no intermediate part between the two parts. Although the figures show layers and regions with clean lines and boundaries, some or all of these lines and/or boundaries may be idealized. In reality, the boundaries and/or lines may be unobservable, blended, and/or irregular.

Descriptors "first," "second," "third," etc. are used herein when identifying multiple elements or components which may be referred to separately. Unless otherwise specified or understood based on their context of use, such descriptors are not intended to impute any meaning of priority, physical order or arrangement in a list, or ordering in time but are merely used as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

DETAILED DESCRIPTION

Compressors are implemented on fluid pipelines to facilitate transport of a fluid (e.g., gas, oil, water) therein. In cases in which the fluid is a gas, compressors can reduce volume of the gas while increasing pressure during transport. One or more compressor units can be implemented in a fluid transfer and depressurization system. In some cases, the fluid transfer and depressurization system can evacuate fluid from a first location (e.g., a first section of pipe) and transfer the fluid to a second location (e.g., a second section of pipe).

In some cases, each compressor unit of the fluid transfer and depressurization system includes an air actuator cylinder and one or more gas compression cylinders. In many cases, the air actuator cylinder has a different cross-sectional diameter compared to the gas compression cylinders. The air actuator cylinder is typically assembled separately from the gas compression cylinders, and a moveable rod is disposed therebetween to operatively coupled the air actuator cylinder to the gas compression cylinders.

In examples disclosed herein, an example single-tube compressor units can be used to transfer fluid between one or more locations. In examples disclosed herein, the single-tube compressor unit includes an example actuation cylinder and an example compression cylinder disposed within a single-tube casing. In some examples, a first piston operatively disposed within the actuation cylinder is pneumatically actuated. In other examples, the first piston can be hydraulically actuated or electrically actuated. In some examples, multiple ones of the single-tube compressor units can be operatively coupled together to increase a pressure and/or rate of compression of fluid therethrough. Advantageously, the single-tube compressor unit disclosed herein can be manufactured within a single-tube casing, thereby reducing the complexity and/or number of parts required and, thus, reducing manufacturing costs. Although the following systems and methods can apply to a variety of fluids, gas is used as an example in the following description.

FIG. 1 is a schematic illustration of an example fluid transfer and depressurization system (e.g., fluid transfer system) 100. The example fluid transfer and depressurization system 100 is configured to transport content (e.g., gas, other fluid) from a first location to a second location. The example fluid transfer and depressurization system 100 includes an example fluid intake 102 coupled to the first location and an example fluid outlet (e.g., fluid discharge) 104 coupled to the second location. Fluid (e.g., gas) is compressed by example compressor units 106A, 106B as the fluid flows from the fluid intake 102 to the fluid discharge 104. The compressor units 106A, 106B each include example gas pistons 108A, 108B implemented in example gas compression cylinders (e.g., gas cylinders) 110A, 110B, and an example air piston 112 implemented in an example air cylinder 114. The air cylinder 114 includes an example first chamber 116 and an example second chamber 118 coupled to an example air supply 120 via an example air control valve 122. The gas cylinders 110A, 110B include example third chambers 124A, 124B and example fourth chambers 126A, 126B coupled to the fluid intake 102 via inlet check valves 128A, and coupled to the fluid outlet via outlet check valves 128B.

In the illustrated example of FIG. 1, gas enters via the fluid intake 102 and flows to the compressor units 106A, 106B via example piping 130. The gas enters the third chambers 124A, 124B and the fourth chambers 126A, 126B through the inlet check valves 128A. The inlet check valves 128A allow the gas to flow unidirectionally from the fluid intake 102 to the compressor units 106A, 106B. The air control valve 122 also directs compressed air from the air supply 120 to enter the air cylinder 114. The air control valve 122 can alternate flow of the compressed air between the first chamber 116 and the second chamber 118. In the illustrated example, the air control valve 122 directs compressed air into the first chamber 116 in response to a first switch 129A being engaged, and directs compressed air into the second chamber 118 in response to a second switch 129B being engaged, where the first switch 129A and the second switch 129B are operatively coupled to the air control valve 122. In other examples, the air control valve 122 can switch a direction of flow of the compressed air based on a command and/or a signal from a computer and/or other processor communicatively coupled to the air control valve 122.

In the illustrated example, an under-pressure cutoff 131 is coupled to the piping 130 between the fluid intake 102 and the air control valve 122. In some examples, the under-pressure cutoff 131 can detect whether a pressure of the fluid in the piping 130 drops below a threshold pressure (e.g., cutoff pressure). In response to the under-pressure cutoff 131 determining that the pressure of the fluid has dropped below the cutoff pressure, the under-pressure cutoff 131 can send an air signal to the air control valve 122 to shut off the flow of compressed air into the compressor units 106A, 106B and, as such, prevent the compressor units 106A, 106B from further compressing the fluid. In examples disclosed herein, the under-pressure cutoff 131 is disabled (e.g., turned off) so that the compressor units 106A, 106B can continue to compress the fluid below the cutoff pressure. As such, disabling the under-pressure cutoff 131 allows the first location of the fluid to achieve a negative pressure and create a vacuum in the first location.

In the illustrated example of FIG. 1, in response to the air control valve 122 directing the compressed air to flow into the first chamber 116, the compressed air generates pressure on the air piston 112 to move the air piston 112 to the right (e.g., towards the second gas cylinder 110B). The air piston 112 is operatively coupled to the gas pistons 108A, 108B via an example rod 132, such that the gas pistons 108A, 108B move with the air piston 112. In response to the air piston 112 moving to the right and, thus, the gas pistons 108A, 108B moving to the right, the gas in the fourth chambers 126A, 126B is compressed by the gas pistons 108A, 108B. Compressed gas is expelled from the fourth chambers 126A, 126B and flows through the respective outlet check valves 128B towards the fluid discharge 104. The outlet check valves 128B allow the gas to flow unidirectionally from the fluid intake 102 to the compressor units 106A, 106B.

In response to the air piston 112 being positioned to the right, the air piston 112 engages the second switch 129B coupled to the right side of the air cylinder 114. In response to the second switch 129B being engaged, the air control valve 122 stops the flow of compressed air to the first chamber 116 and directs the flow of compressed air to enter the second chamber 118. The compressed air from the first chamber 116 can be expelled to the atmosphere via air exhaust tubing 134. In some examples, the compressed air from the first chamber 116 can be used to cool the compressed gas via an example heat exchanger 136 prior to the compressed air being expelled to the atmosphere.

In response to the air control valve 122 directed the flow of compressed air to enter the second chamber 118, the compressed air causes the air piston 112 and the gas pistons 108A, 108B to move to the left (e.g., toward the first gas cylinder 110A). The gas in the third chambers 124A, 124B is compressed by the gas pistons 108A, 108B. The compressed gas is expelled from the third chambers 124A, 124B and flows through the respective outlet check valves 128B towards the fluid discharge 104.

When the air piston 112 is positioned to the left, the air piston 112 engages the first switch 129A coupled to the left side of the air cylinder 114. In response to the first switch 129A being engaged, the air control valve 122 stops the flow of compressed air to the second chamber 118 and once again directs the flow of compressed air to enter the first chamber 116. In the illustrated example, the air control valve 122 continuously redirects the flow of compressed air between the first chamber 116 and the second chamber 118 to compress gas entering the third chambers 124A, 124B and the fourth chambers 126A, 126B. The above process repeats until the gas is evacuated from the first location (e.g., coupled to the fluid intake 102) and transferred to the second location (e.g., coupled to the fluid discharge 104).

Figure 2:
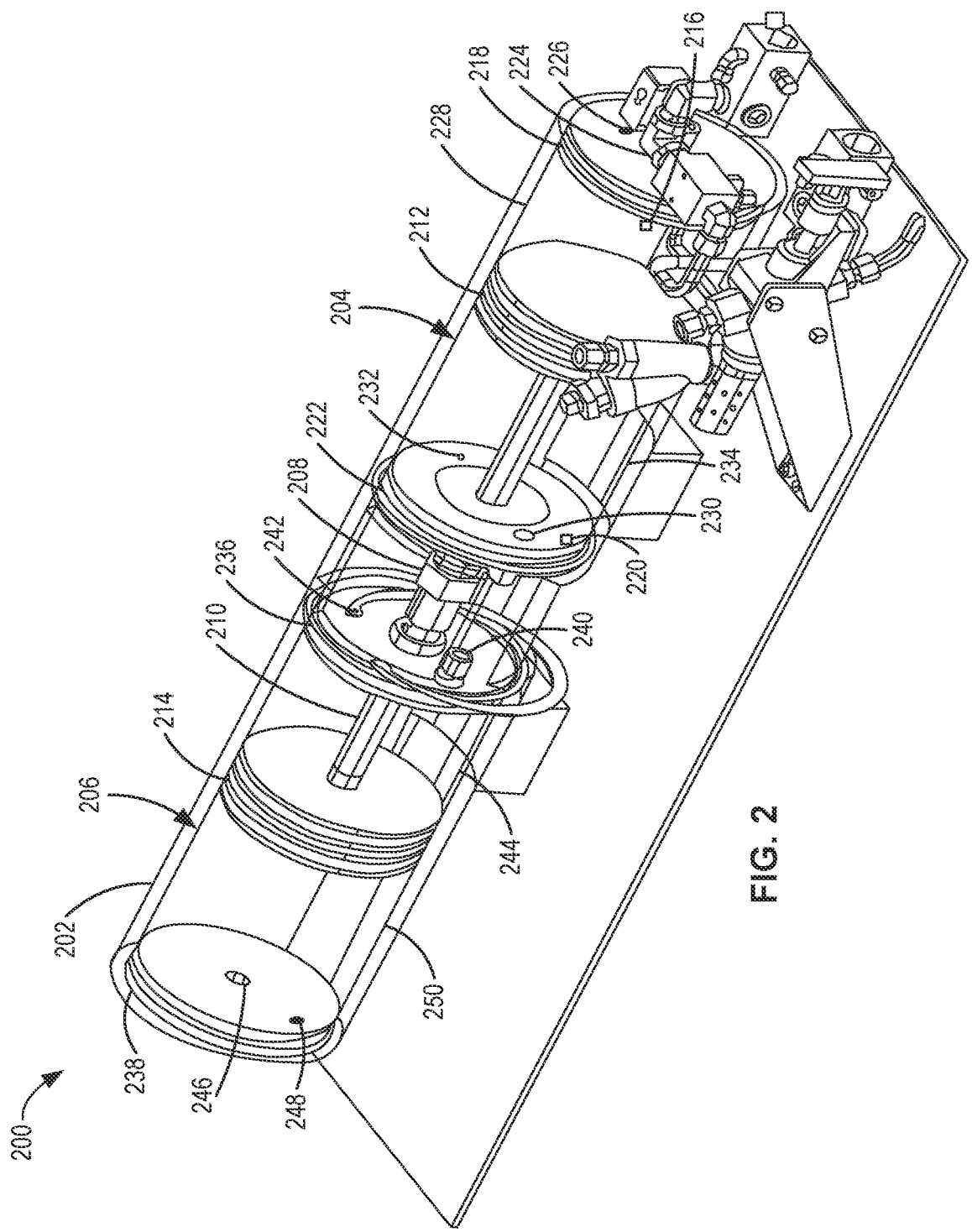
FIG. 2 is a partial view of an example single-tube compressor unit in accordance with teachings of this disclosure.

FIG. 2 is a partial view of an example single-tube compressor unit 200 in accordance with teachings of this disclosure. In some examples, the single-tube compressor unit 200 can be used instead of the fluid transfer and depressurization system 100 of FIG. 1 to compress and/or transport fluid between one or more locations. For example, the single-tube compressor unit 200 can be operatively coupled between the fluid intake 102 and the fluid discharge 104 of FIG. 1. In other examples, the single-tube compressor unit 200 can replace each of the compressor units 106A, 106B within the fluid transfer and depressurization system 100 of FIG. 1.

In the illustrated example of FIG. 2, the single-tube compressor unit 200 includes an example casing (e.g., single-tube casing) 202. The single-tube compressor unit 200 further includes an example actuation cylinder 204 and an example compression cylinder 206 disposed within the casing 202, and an example connector 208 coupled between the actuation cylinder 204 and the compression cylinder 206. In this example, an example rod 210 is slidably disposed within the single-tube compressor unit 200, including an example first piston 212 and an example second piston 214 slidably disposed in the actuation cylinder 204 and the compression cylinder 206, respectively. Furthermore, the actuation cylinder 204 includes an example first pneumatic switch 216 coupled to a first end cap 218 of the actuation cylinder 204, and an example second pneumatic switch 220 coupled to an example second end cap 222 of the actuation cylinder 204 opposite the first end cap 218. In this example, the single-tube compressor unit 200 is configured as a pneumatically-actuated compressor. In other examples, the single-tube compressor unit 200 can be hydraulically actuated or electrically actuated. While the first and second pneumatic switches 216, 220 are implemented on the first and second end caps 218, 222 of the actuation cylinder 204 in this example, the first and second pneumatic switches 216, 220 may be implemented in the compression cylinder 206 instead.

In the illustrated example of FIG. 2, the first end cap 218 of the actuation cylinder 204 includes a first inlet opening 224 and a first outlet opening 226. Air can be provided to an example first actuation chamber 228 of the actuation cylinder 204 via the first inlet opening 224, and air can be expelled from the first actuation chamber 228 via the first outlet opening 226. In some examples, the air can be compressed air provided from an air supply (e.g., the air supply 120 of FIG. 1) operatively coupled to the single-tube compressor unit 200. Furthermore, the second end cap 222 of the actuation cylinder 204 includes a second inlet opening 230 and a second outlet opening 232. Air can similarly be provided to an example second actuation chamber 234 of the actuation cylinder 204 via the second inlet opening 230, and air can be expelled from the second actuation chamber 234 via the second outlet opening 232. In this example, the casing 202, the first end cap 218, and the first piston 212 define the first actuation chamber 228, and the casing 202, the second end cap 222, and the first piston 212 define the second actuation chamber 234. In this example, the first piston 212 includes one or more seals to prevent air from flowing between the first and second actuation chambers 228, 234.

In the illustrated example of FIG. 2, the compression cylinder 206 includes an example third end cap 236 and an example fourth end cap 238 opposite the third end cap 236. The third end cap 236 includes an example third inlet opening 240 and an example third outlet opening 242. Gas can be provided to an example first compression chamber 244 of the compression cylinder 206 via the third inlet opening 240, and gas can be expelled from the first compression chamber 244 via the third outlet opening 242. In some examples, the gas can be provided from the fluid intake 102 of FIG. 1, which can be operatively coupled to the single-tube compressor unit 200. Furthermore, the fourth end cap 238 includes an example fourth inlet opening 246 and an example fourth outlet opening 248. Gas can similarly be provided to an example second compression chamber 250 of the compression cylinder 206 via the fourth inlet opening 246, and gas can be expelled from the second compression chamber 250 via the fourth outlet opening 248. In this example, the casing 202, the third end cap 236, and the second piston 214 define the first compression chamber 244, and the casing 202, the fourth end cap 238, and the second piston 214 define the second compression chamber 250. In this example, the second piston 214 includes one or more seals to prevent air from flowing between the first and second compression chambers 244, 250.

During operation of the single-tube compressor unit 200, air is provided to the first and second actuation chambers 228, 234 in a reciprocating motion to compress gas in the first and second compression chambers 244, 250. For example, when compressed air is provided to the first actuation chamber 228, a pressure in the first actuation chamber 228 on the first piston 212 increases such that the first piston 212 moves leftward in the illustrated example of FIG. 2 toward the second end cap 222. The first piston 212 is operatively coupled to the second piston 214 via the rod 210, such that the second piston 214 moves leftward with the first piston 212. When the second piston 214 moves leftward, the second piston 214 compresses the gas in the second compression chamber 250, and the compressed gas is expelled from the second compression chamber 250 via the fourth outlet opening 248.

When the first piston 212 reaches a position proximate the second end cap 222, the first piston 212 engages the second pneumatic switch 220. In response to the second pneumatic switch 220 being engaged, flow of compressed air to the first actuation chamber 228 is prevented (e.g., by the air control valve 122 of FIG. 1), and the flow of compressed air is directed to the second actuation chamber 234. Accordingly, a pressure in the second actuation chamber 234 on the first piston 212 increases such that the first piston 212 moves rightward in the illustrated example of FIG. 2 toward the first end cap 218. The second piston 214 moves rightward with the first piston 212 and compresses the gas in the first compression chamber 244. The compressed gas is expelled from the first compression chamber 244 via the third outlet opening 242. When the first piston 212 reaches a position proximate the first end cap 218, the first piston 212 engages the first pneumatic switch 216, and the air control valve 122 once again directs the flow of compressed air to the first actuation chamber 228. In some examples, the single-tube compressor unit 200 continually compresses gas in the first and second compression chambers 244, 250 until the gas has been evacuated from the first location coupled to the fluid intake 102.

In examples disclosed herein, the single tube-compressor unit is operatively coupled between the fluid intake 102 and the fluid discharge 104 to transfer fluid therebetween (e.g., instead of the fluid transfer and depressurization system 100 of FIG. 1). In other examples, the single-tube compressor unit 200 can be implemented within the fluid transfer and depressurization system 100 to reduce a size thereof. For example, the single-tube compressor unit 200 can replace each of the compressor units 106A, 106B described in connection with FIG. 1. In FIG. 1, the air cylinder 114 has a different cross-sectional diameter from the gas cylinders 110A, 110B, such that the air cylinder 114 is manufactured separately from the gas cylinders 110A, 110B prior to assembly of each of the compressor units 106A, 106B. Advantageously, by implementing the single-tube compressor unit 200 in the fluid transfer and depressurization system 100 instead of the compressor units 106A, 106B, the number of parts required and, thus, the cost to manufacture the fluid transfer and depressurization system 100 can be reduced.

In some examples, multiple ones of the single-tube compressor unit 200 can be operatively coupled together to compress and evacuate the fluid. In such examples, the number of the single-tube compressor units 200 can be selected based on flow rate, pressure, and/or size requirements. Advantageously, as a result of the relatively compact size and shape of the single-tube compressor unit 200, multiple ones of the single-tube compressor unit 200 can be implemented in a relatively small area and/or volume. In some examples, the multiple ones of the single-tube compressor unit 200 can be configured to selectively operate in a series arrangement and/or in a parallel arrangement. In such examples, a rate of compression and/or a differential pressure of the gas compressed by the multiple ones of the single-tube compressor unit 200 can be modified based on the arrangement of the single-tube compressor units 200 (e.g., in series and/or in a parallel).

Figure 3:
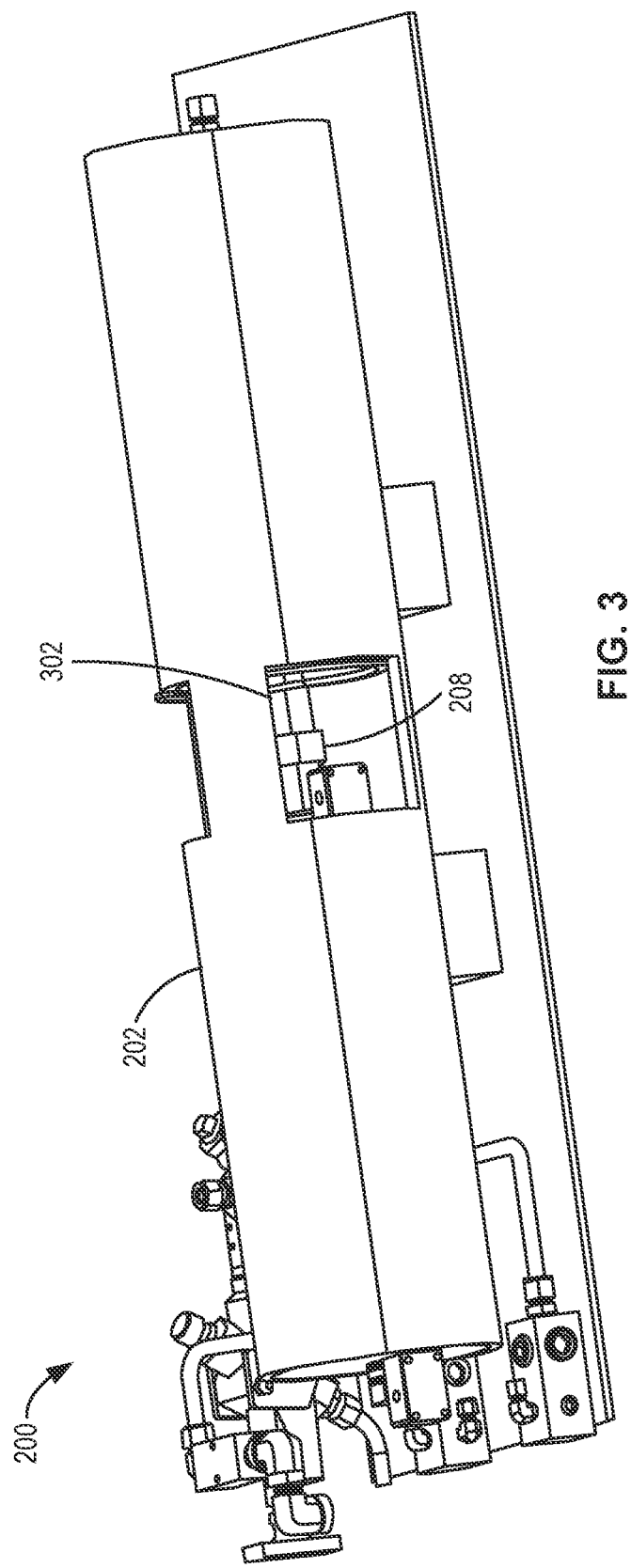
FIG. 3 is a perspective view of the example single-tube compressor unit of FIG. 2.

FIG. 3 is a perspective view of the example single-tube compressor unit 200 of FIG. 2. In the illustrated example of FIG. 3, the casing 202 surrounds the actuation cylinder 204 and the compression cylinder 206 shown in FIG. 2. The casing 202 is a single tube constructed of a metal material (e.g., steel, aluminum, etc.). In this example, the casing 202 has a circular cross-sectional shape. In other examples, the casing 202 can have a different cross-sectional shape. Furthermore, the casing 202 includes an opening 302 between the actuation cylinder 204 and the compression cylinder 206. The opening 302 provides access to the connector 208, and to the second inlet and outlet openings 230, 232 and the third inlet and outlet openings 240, 242 shown in FIG. 2. In some examples, multiple ones of the opening 302 are disposed around a circumference of the casing 202 between the actuation cylinder 204 and the compression cylinder 206.

Figure 4:
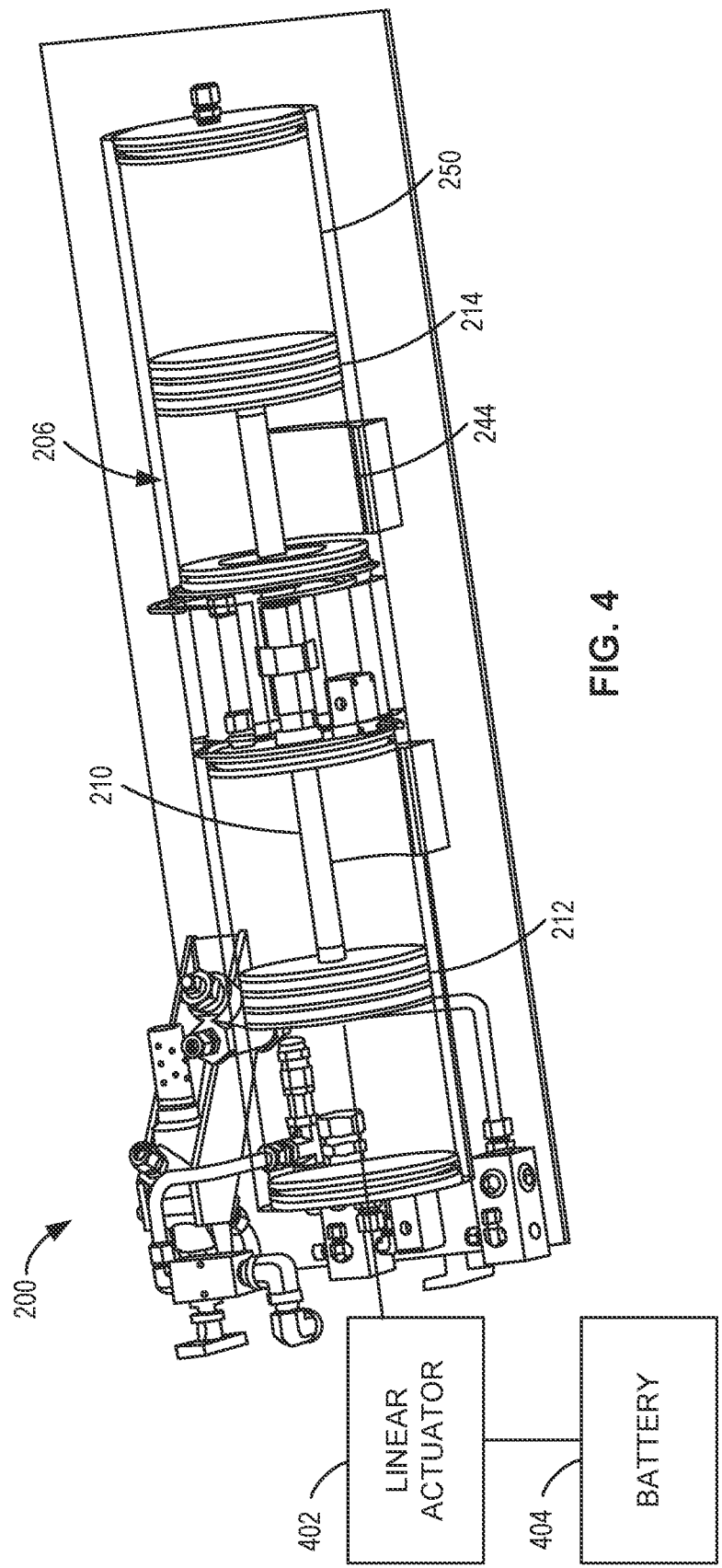
FIG. 4 illustrates the single-tube compressor unit of FIGS. 2 and/or 3 configured for electrical, rather than pneumatic, actuation.

FIG. 4 illustrates the single-tube compressor unit 200 of FIGS. 2 and/or 3 configured for electrical, rather than pneumatic, actuation. In such examples, gas from the fluid intake 102 of FIG. 1 is not compressed using compressed air from the air supply 120, but rather is compressed via an example linear actuator 402. As such, in this example, the fluid transfer and depressurization system 100 does not include the air control valve 122, the air supply 120, and/or the air exhaust tubing 134 of FIG. 1. The linear actuator 402 is coupled to and/or powered by an example battery 404.

In the illustrated example of FIG. 4, the linear actuator 402 is operatively coupled to the first piston 212 to move the second piston 214 inside the compression cylinder 206. In other examples, the first piston 212 is omitted from the single-tube compressor unit 200, and the linear actuator 402 is instead operatively coupled to the rod 210. In this example, the linear actuator 402 is configured such that the second piston 214 moves rightward (e.g., in the illustrated example of FIG. 4) when the linear actuator 402 extends, and the second piston 214 moves leftward when the linear actuator 402 contracts. Alternatively, in other examples, the linear actuator 402 is configured such that the second piston 214 moves rightward when the linear actuator 402 contracts, and the second piston 214 moves leftward when the linear actuator 402 extends.

In the illustrated example of FIG. 4, when the linear actuator 402 moves the second piston 214 to the right, the second piston 412 compresses gas in the second compression chamber 250. The compressed gas exits the second compression chamber 250 via the fourth outlet opening 248 shown in FIG. 2. Alternatively, when the linear actuator 402 moves the gas piston 108 to the left, the second piston 412 compresses gas in the first compression chamber 244. The compressed gas is expelled from the first compression chamber 244 via the third outlet opening 242 shown in FIG. 2. In this example, the linear actuator 402 continuously moves between an extended position and a contracted position to compress gas entering the first and second compression chambers 244, 250 until the gas is evacuated from a first location (e.g., coupled to the fluid intake 102) and transferred to a second location (e.g., coupled to the fluid discharge 104 of FIG. 1).

Figure 5:
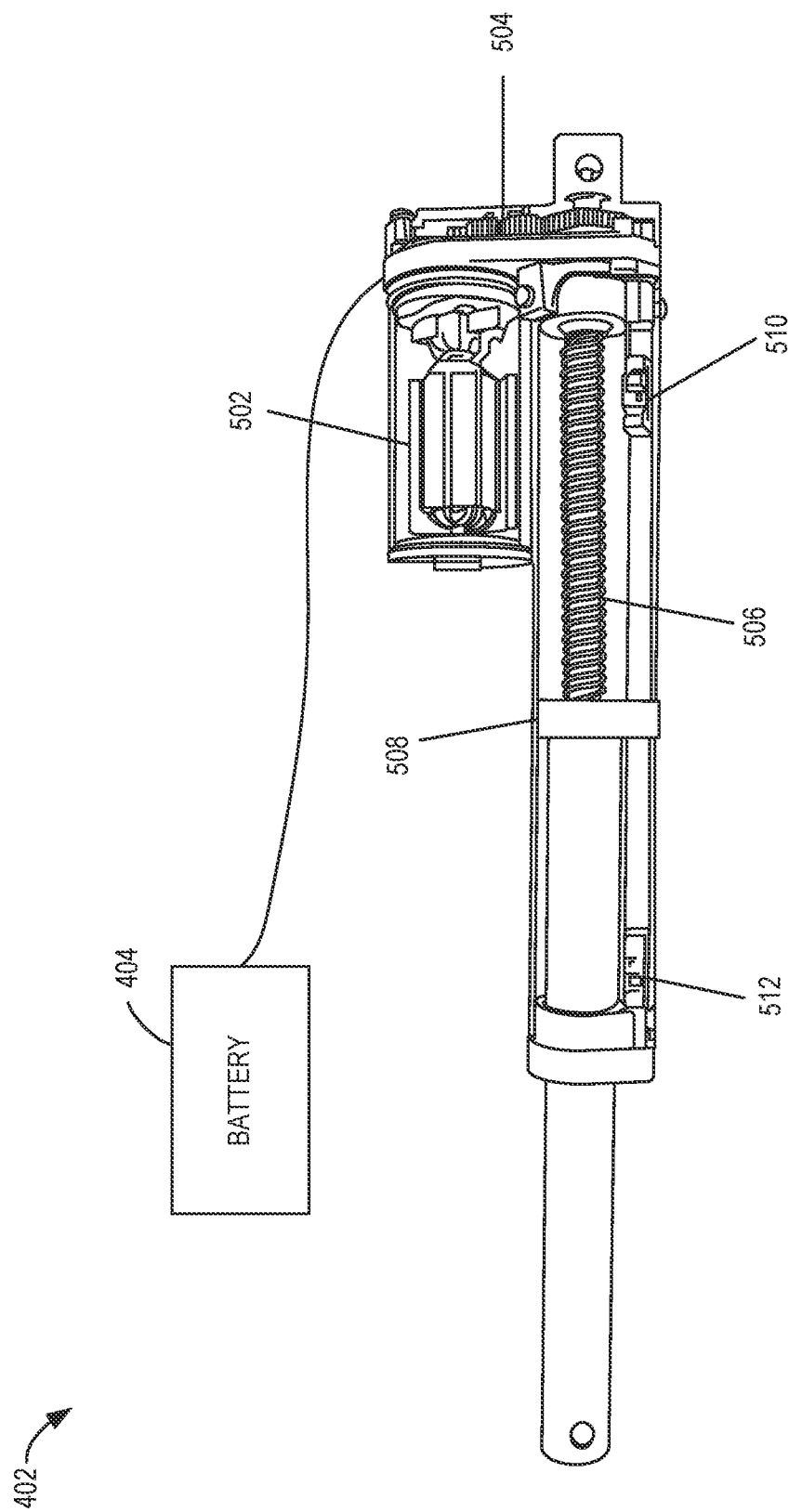
FIG. 5 illustrates a perspective view of the example linear actuator of FIG. 4.

FIG. 5 illustrates a perspective view of the example linear actuator 402 of FIG. 4. The example linear actuator 402 includes an example motor 502 coupled to the battery 404, an example gear box 504, an example lead screw 506, an example drill nut 508, an example retract limit switch 510, and an example extend limit switch 512. In the illustrated example of FIG. 5, rotation of the motor 502 causes corresponding rotation of the lead screw 506 via the gear box 504. The rotation of the lead screw 506 causes linear travel of the drill nut 508 along the lead screw 506 and, as such, causes the linear actuator 402 to extend or retract based on a direction of rotation of the motor 502 and/or the lead screw 506. For example, the linear actuator 402 extends when the motor 502 rotates in a first direction, and the linear actuator 402 retracts when the motor 502 rotates in a second direction, where the second direction is opposite from the first direction.

In the illustrated example of FIG. 5, when the linear actuator 402 is fully extended, the drill nut 508 engages the extend limit switch 512. In such examples, the extend limit switch 512 sends a first electrical signal to the motor 502. In some examples, the first electrical signal causes the motor 502 to stop rotating and/or reverse the direction of rotation (e.g., from the first direction to the second direction). Alternatively, when the linear actuator 402 is fully retracted, the drill nut 508 engages the retract limit switch 510. In such examples, the retract limit switch 510 sends a second electrical signal to the motor 502. In some examples, the second electrical signal causes the motor 502 to stop rotating and/or reverse the direction of rotation (e.g., from the second direction to the first direction). As such, repeatedly engaging the retract limit switch 510 and the extend limit switch 512 causes linear reciprocal travel of the linear actuator 402 to compress the gas in the compression cylinder 206 of FIG. 2.

In this example, the retract limit switch 510 and the extend limit switch 512 of the linear actuator 402 are implemented instead of the first and second pneumatic switches 216, 220 of the single-tube compressor unit 200. Alternatively, in some examples, the retract limit switch 510 and the extend limit switch 512 are omitted from the linear actuator 402, and the motor 502 is instead communicatively coupled to the first and second pneumatic switches 216, 220.

In such examples, the second pneumatic switch 220 sends the first electrical signal to the motor 502 when the first piston 212 is proximate the second end cap 222, and the first pneumatic switch 216 sends the second electrical signal to the motor 502 when the first piston 212 is proximate the first end cap 218. Alternatively, the first and second pneumatic switches 216, 220 can be coupled to the third and fourth end caps 236, 238 of FIG. 2, respectively. In such an example, the second pneumatic switch 220 sends the first electrical signal to the motor 502 when the second piston 214 is proximate the fourth end cap 238, and the first pneumatic switch 216 sends the second electrical signal to the motor 502 when the second piston 214 is proximate the third end cap 236. Accordingly, repeatedly engaging the first and second pneumatic switches 216, 220 causes linear reciprocal travel of the linear actuator 402 to compress the gas in the compression cylinder 206.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

Figure 6:
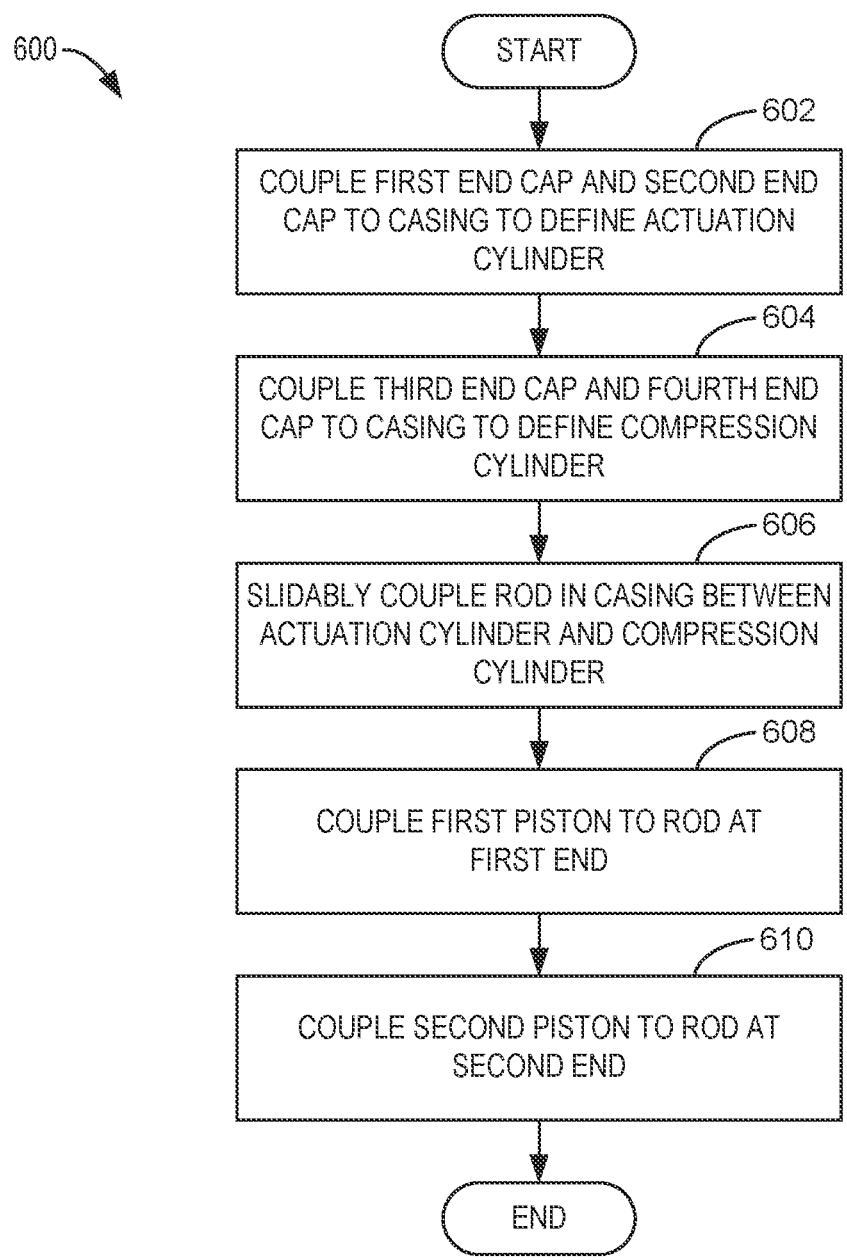
FIG. 6 is a flowchart representative of instructions which may be executed to produce the example single-tube compressor system of FIGS. 2-4 in accordance with teachings of this disclosure.

FIG. 6 is a flowchart representative of instructions 600 which may be executed to produce (e.g., manufacture and/or assemble, etc.) the example single-tube compressor unit 200 of FIGS. 2-4 in accordance with teachings of this disclosure. The instructions 600 begin as the casing 202 of FIG. 2 is constructed from a metal material (e.g., steel, aluminum, etc.).

At block 602, the first end cap 218 and the second end cap 222 are coupled to the casing 202. For example, the first end cap 218, the second end cap 222, and the casing 202 define the actuation cylinder 204.

At block 604, the third end cap 236 and the fourth end cap 238 are coupled to the casing 202. For example, the third end cap 236, the fourth end cap 238, and the casing 202 define the compression cylinder 206.

At block 606, the rod 210 is slidably coupled in the casing 202 between the actuation cylinder 204 and the compression cylinder 206. For example, the rod 210 is slidable within the connector 208 coupled between the actuation and compression cylinders 204, 206.

At block 608, the first piston 212 is coupled to the rod 210 at a first end of the rod 210. For example, the first end of the rod 210 is in the actuation cylinder 204. The first piston 212 is slidable relative to the actuation cylinder 204.

At block 610, the second piston 214 is coupled to the rod 210 at a second end of the rod 210. The second end of the rod 210 is opposite the first end. For example, the second end of the rod 210 is in the compression cylinder 206. The second piston 214 is slidable relative to the compression cylinder 206 to compress fluid (e.g., gas) therein.

Figure 7:
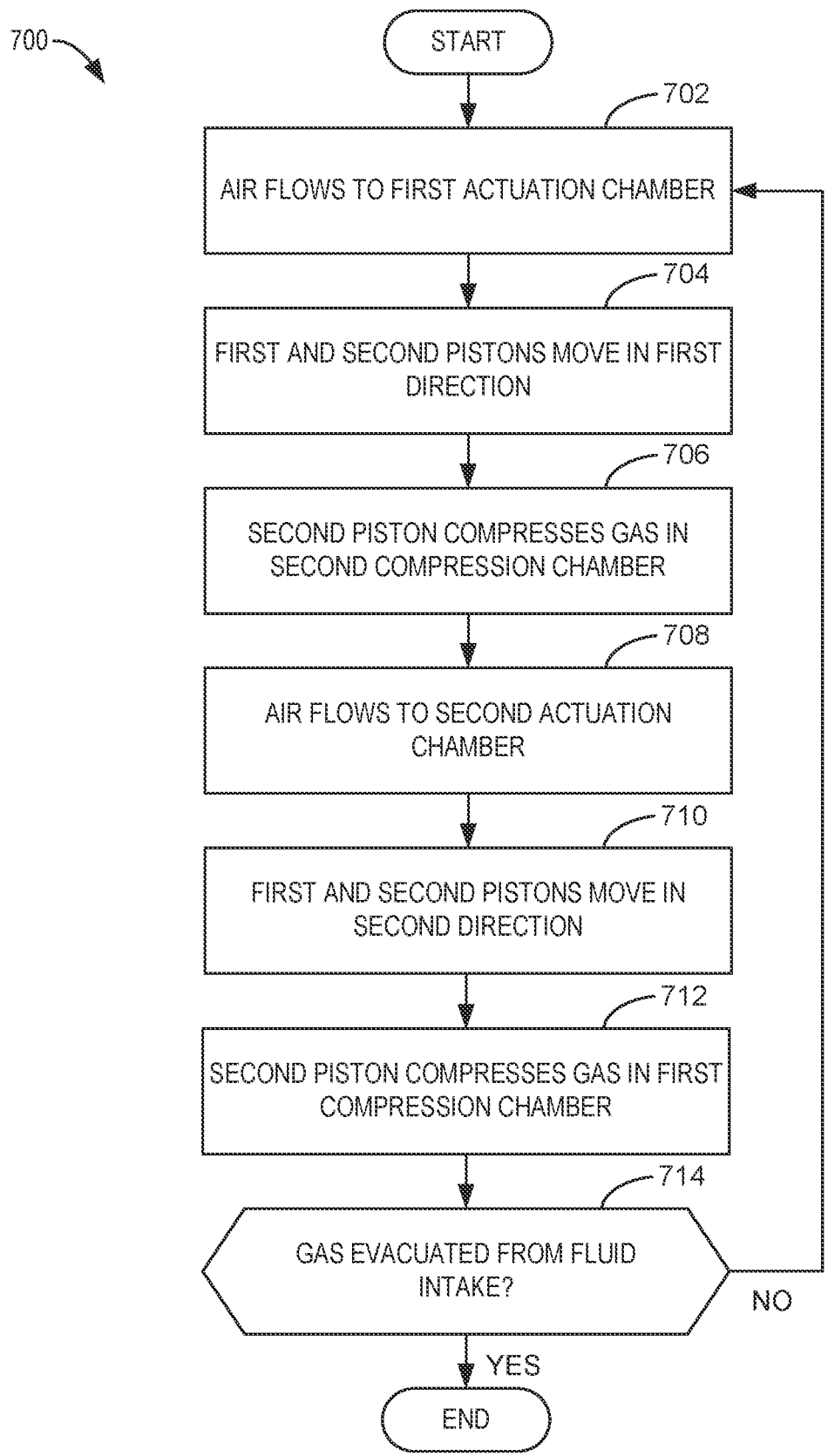
FIG. 7 is a flowchart representative of an example process that may be executed by the example single-tube compressor unit 200 of FIGS. 2-4 in accordance with teachings of this disclosure.

FIG. 7 is a flowchart representative of an example process 700 that may be executed by the example single-tube compressor unit 200 of FIGS. 2-4 in accordance with teachings of this disclosure. The process 700 begins as the single-tube compressor unit 200 is operatively coupled between the fluid intake 102 and the fluid discharge 104 of FIG. 1.

At block 702, air flows to the first actuation chamber 228. For example, the air enters the first actuation chamber 228 from the fluid intake 102 via the first inlet opening 224. In such examples, air present in the first actuation chamber 228 increases a pressure on the first piston 212 in a first direction.

At block 704, the first and second pistons 212, 214 move in the first direction. For example, the first and second pistons 212, 214 move leftward in the illustrated example of FIG. 2.

At block 706, the second piston 214 compresses gas in the second compression chamber 250. In some examples, the compressed gas exits the second compression chamber 250 via the fourth outlet opening 248 and flows toward the fluid discharge 104.

At block 708, air flows to the second actuation chamber 234. For example, the air enters the second actuation chamber 234 from the fluid intake 102 via the second inlet opening 230. In such examples, the gas increases a pressure on the first piston 212 in a second direction opposite the first direction.

At block 710, the first and second pistons 212, 214 move in a second direction. For example, the first and second pistons 212, 214 move rightward in the illustrated example of FIG. 2.

At block 712, the second piston 214 compresses gas in the first compression chamber 244. In some examples, the compressed gas exits the first compression chamber 244 via the third outlet opening 242 and flows toward the fluid discharge 104.

At block 714, in response to the gas not being evacuated from the fluid intake 102, the process returns to block 702.

Alternatively, in response to the gas being evacuated from the fluid intake 102, the process ends.

FIG. 8A illustrates an example two-cylinder compressor 800, which can be used instead of or in addition to the single-tube compressor unit 200 of FIG. 2. In the illustrated example of FIG. 8A, an example air casing 802 defines the actuation cylinder 204, and an example gas casing 804 defines the compression cylinder 206. In this example, the air casing 802 and the gas casing 804 are separate. That is, while the casing 202 shown in the example of FIG. 2 is a single tube, the air casing 802 and the gas casing 804 are not configured as a single tube. In other examples, the air casing 802 and the gas casing 804 can be connected as a single tube. In the illustrated example of FIG. 8A, in the two-cylinder compressor 800, the air casing 802 is coupled between example inner and outer air plates 806, 808, and the gas casing 804 is coupled between example inner and outer gas plates 810, 812. An example ring 814 is coupled between the inner air and gas plates 806, 810, where the ring 814 includes one or more example cutouts 816 that enable an operator to access the inner air and gas plates 806, 810 and an example shaft 818 movable longitudinally within the two-cylinder compressor 800.

In the illustrated example of FIG. 8A, the inner and outer air plates 806, 808 are coupled via first example threaded rods 820, and the inner and outer gas plates 810, 812 are coupled via second example threaded rods 822. In this example, nuts (e.g., hex jam nuts, etc.) 824 are implemented along the threaded rods 820, 822 and tightened against outer surfaces 826, 828 of the outer air and gas plates 808, 812. The nuts 824 and the threaded rods 820, 822 enable the air casing 802 to be sealably coupled between the inner and outer air plates 806, 808 and/or the gas casing 804 to be sealably coupled between the inner and outer gas plates 810, 812 without the use of permanent coupling techniques such as welding. In some examples, assembly of the two-cylinder compressor 800 via the nuts 824 and the threaded rods 820 enables parts of the two-cylinder compressor 800 to be easily accessed and/or removed for repair and/or replacement.

FIG. 8B illustrates the example two-cylinder compressor 800 of FIG. 8A with the example air and gas casings 802, 804 removed and/or made transparent. In the illustrated example of FIG. 8B, an example air piston 830 is coupled to a first end of the shaft 818, and an example gas piston 832 is coupled to a second end of the shaft 818 opposite the first end. In this example, the air and gas pistons 830, 832 are screwed onto threaded portions of the first and second ends of the shaft 818. In other examples, the air and gas pistons 830, 832 are welded to the first and second ends of the shaft 818. During operation of the two-cylinder compressor 800, the gas piston 832 moves between a first inner surface 834 of the outer gas plate 812 and a second inner surface 836 of the inner gas plate 810 to compress gas inside the gas casing 804. Similarly, during operation of the two-cylinder compressor 800, the air piston 830 moves between a third inner surface 838 of the inner air plate 806 and a fourth inner surface 840 of the outer air plate 808. For example, air is directed to the air casing 802 of FIG. 8A to move the air piston 830 between the third and fourth surfaces 383, 840 to cause compression of the gas in the gas casing 804 by the gas piston 832.

Figure 9B:
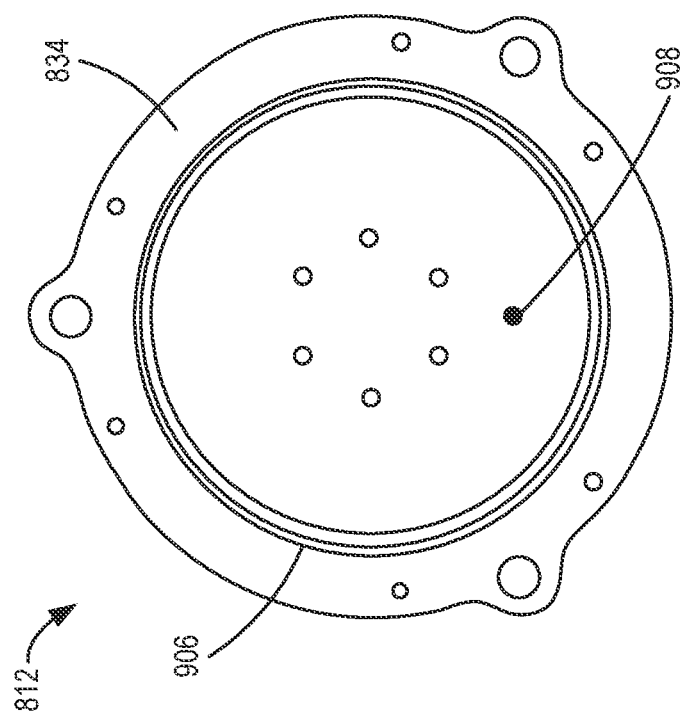
FIG. 9B illustrates a second side of the example outer cylinder plate of FIG. 9A.
Figure 9A:
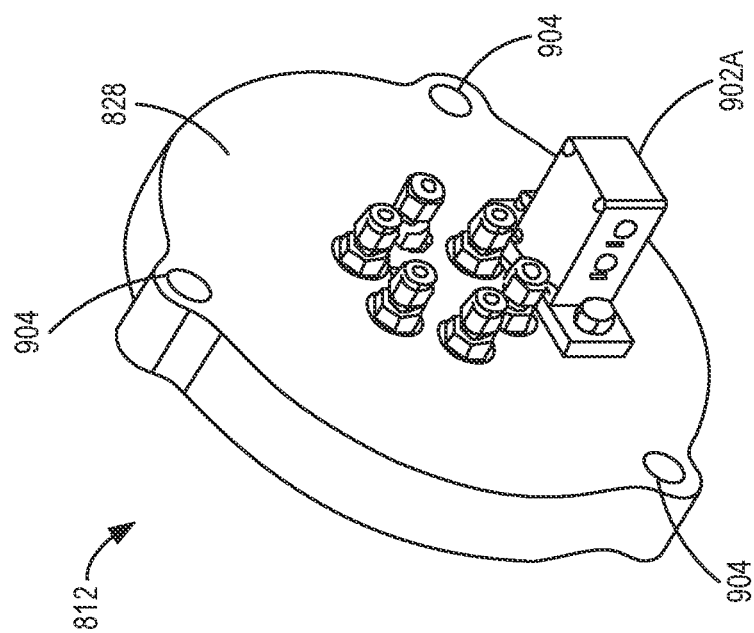
FIG. 9A illustrates a first side of an example outer cylinder plate of the example two-cylinder compressor of FIGS. 8A and/or 8B.

FIGS. 9A and 9B illustrate a first side and a second side, respectively, of the example outer gas plate 812 of FIGS. 8A and/or 8B. In the illustrated example of FIG. 9A, a first example stroke end switch 902A is coupled to the outer surface 828 of the outer gas plate 812. In some examples, the first stroke end switch 902A is operatively coupled to the air control valve 122 of FIG. 1. In some examples, the first stroke end switch 902A can switch the air control valve 122 from a first state to a second state, where the air control valve 122 in the second state directs air to the air casing 802 to the right of the air piston 830 of FIG. 8B. In this example, the outer gas plate 812 includes example rod openings 904 in which the second threaded rods 822 can be disposed. While three of the rod openings 904 are shown in this example, in other examples, a different number of the rod openings 904 and/or a different number of the second threaded rods 822 may be used instead.

Turning to FIG. 9B, the first inner surface 834 includes a seal (e.g., a rubber seal, a rubber ring, etc.) 906. In some examples, the seal 906 is coupled between the outer gas plate 812 and the gas casing 804 of FIG. 8A to prevent and/or reduce leakage of gas from the gas casing 804. In the illustrated example of FIG. 9B, the outer gas plate 812 includes an example switch opening 908 in which a portion of the first stroke end switch 902A is disposed. In some examples, when the gas piston 832 contacts the first inner surface 834, pressure from the gas piston 832 on the first inner surface 834 actuates the first stroke end switch 902A. In some examples, in response to actuation by the gas piston 832, the first stroke end switch 902A switches the air control valve 122 to the second state, thus causing the air piston 830 to move leftward in the illustrated example of FIG. 8B and causing the gas piston 832 to move away from the outer gas plate 812.

Figure 10:
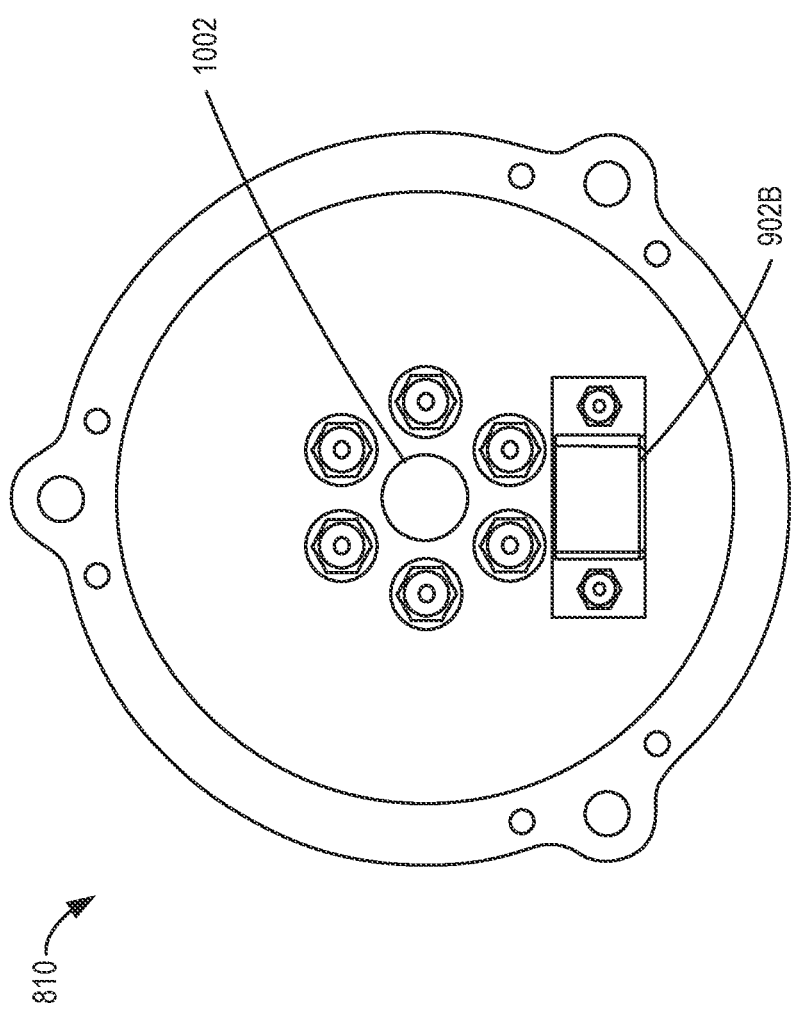
FIG. 10 illustrates an example inner cylinder plate of the example two-cylinder compressor of FIGS. 8A and/or 8B.

FIG. 10 illustrates the example inner gas plate 810 of FIGS. 8A and/or 8B. In this example, the inner gas plate 810 of FIGS. 8A and/or 8B is substantially the same as the outer gas plate 812, but further includes a shaft opening 1002 centrally disposed in the inner gas plate 810 in which the shaft 818 of FIGS. 8A and/or 8B can be disposed. In some examples, the inner gas plate 810 includes a second stroke end switch 902B operatively coupled to the air control valve 122 of FIG. 1. In this example, the second stroke end switch 902B is actuated when the gas piston 832 engages the second inner surface 836 of the inner gas plate 810. In some examples, in response to actuation of the second stroke end switch 902B, the second stroke end switch 902B causes the air control valve 122 to switch to the first state, where the air control valve 122 in the first state provides air to the air casing 802 of FIG. 1 to the left of the air piston 830. Thus, the air control valve 122 causes the air piston 830 to move rightward in the illustrated example of FIG. 8B and causes the gas piston 832 to move away from the inner gas plate 810.

In some examples, the first stroke end switch 902A of FIG. 9A and the second stroke end switch 902B of FIG. 10 repeatedly switch the air control valve 122 between the first and second states to move the gas piston 832 between the first and second inner surfaces 834, 836 and compress the gas in the gas casing 804. In other examples, the first stroke end switch 902A and the second stroke end switch 902B can instead be implemented on the inner air plate 806 and the outer air plate 808, respectively. In such examples, the air piston 830 actuates the first stroke end switch 902A when the air piston 830 engages the third inner surface 838 of the inner air plate 806, and the air piston 830 actuates the second stroke end switch 902B when the air piston 830 engages the fourth inner surface 840 of the outer air plate 808.

Figure 11:
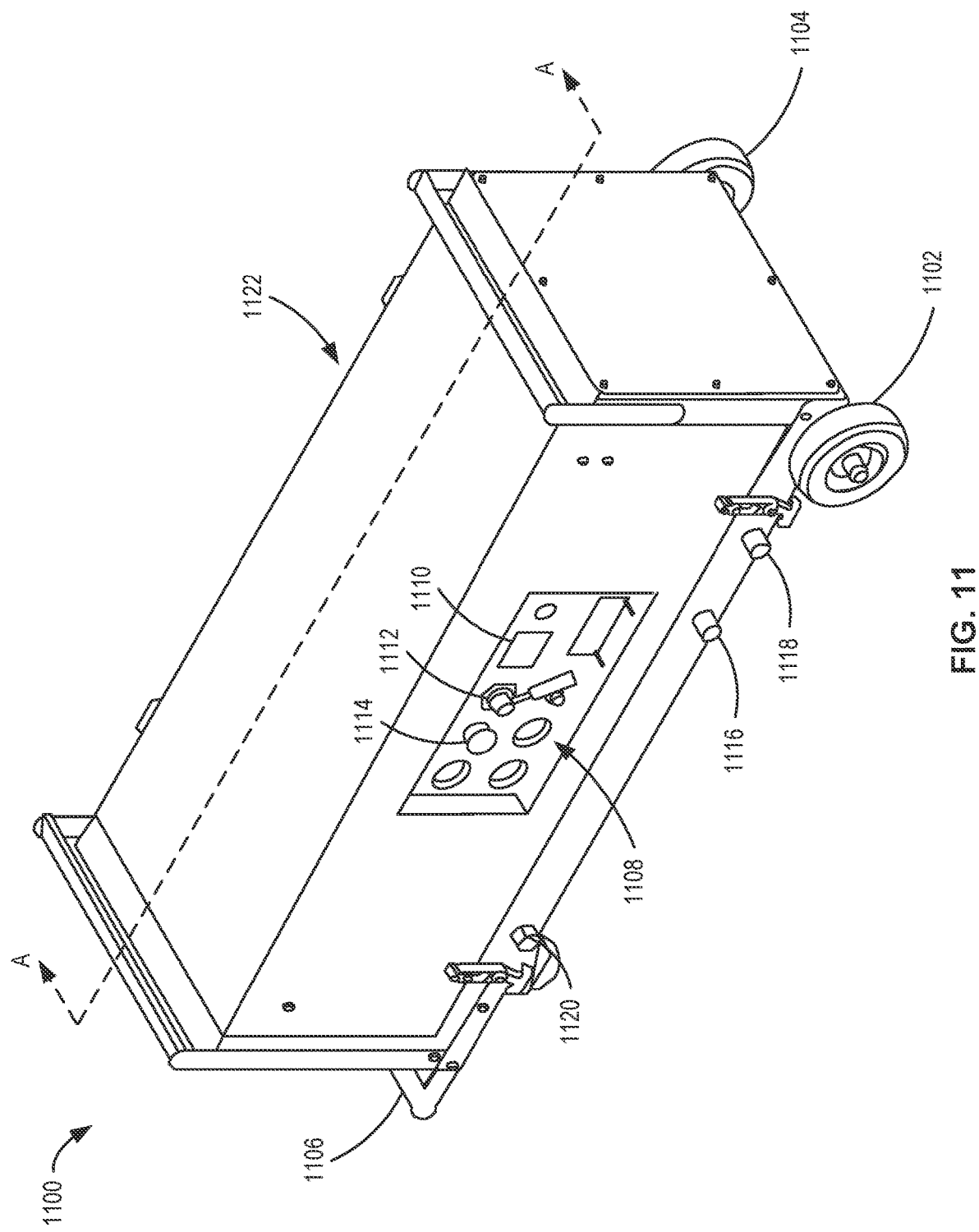
FIG. 11 illustrates an example housing to contain the example single-tube compressor unit of FIG. 2 and/or the example two-cylinder compressor of FIGS. 8A and/or 8B.

FIG. 11 illustrates an example housing 1100 to contain the example single-tube compressor unit 200 of FIG. 2 and/or the example two-cylinder compressor 800 of FIGS. 8A and/or 8B. In the illustrated example of FIG. 11, the housing 1100 includes example wheels 1102, 1104 proximate a first end of the housing 1100, and an example handle 1106 proximate a second end of the housing 1100 opposite the first end. In some examples, an operator of the single-tube compressor unit 200 and/or the two-cylinder compressor 800 can lift the housing 1100 upward at the handle 1106 and move the housing 1100 by rolling the housing 1100 along the wheels 1102, 1104. Accordingly, the handle 1106 and wheels 1102, 1104 enable transportation of the single-tube compressor unit 200 and/or the two-cylinder compressor 800 without the use of additional equipment (e.g., forklifts, vehicles, etc.).

In the illustrated example of FIG. 11, the housing 1100 further includes an operator panel (e.g., control panel) 1108 on a side of the housing 1100. In this example, the operator panel 1108 includes one or more controls by which the operator can control and/or monitor a functionality of the single-tube compressor unit 200 and/or the two-cylinder compressor 800. For example, the operator panel 1108 includes a pressure gauge 1110 to measure and/or display a pressure of a fluid in the single-tube compressor unit 200 and/or the two-cylinder compressor 800. In some examples, the operator panel 1108 includes an example rotary on/off valve 1112 that can be manually operated by the operator to turn on and/or shut off operation of the single-tube compressor unit 200 and/or the two-cylinder compressor 800. In this example, the operator panel 1108 also includes an example emergency stop 1114 that, when actuated, stops and/or prevents operation of the single-tube compressor unit 200 and/or the two-cylinder compressor 800. Additionally or alternatively, the operator panel 1108 may include a stroke override valve, and/or may include a stroke counter to measure and/or display a count of strokes completed by the gas piston 832 of FIG. 8B.

In the illustrated example of FIG. 11, the housing 1100 includes a first example port 1116 through which fluid (e.g., gas) is provided to the single-tube compressor unit 200 and/or the two-cylinder compressor 800, and a second example port 1118 through which compressed fluid flows from the single-tube compressor unit 200 and/or the two-cylinder compressor 800. Furthermore, the housing 1100 includes an air inlet port 1120 through which air is supplied to the actuation cylinder 204 of the single-tube compressor unit 200 and/or the two-cylinder compressor 800. In some examples, the housing 1100 also includes one or more vents 1122 for venting the air from the housing 1100.

Figure 12:
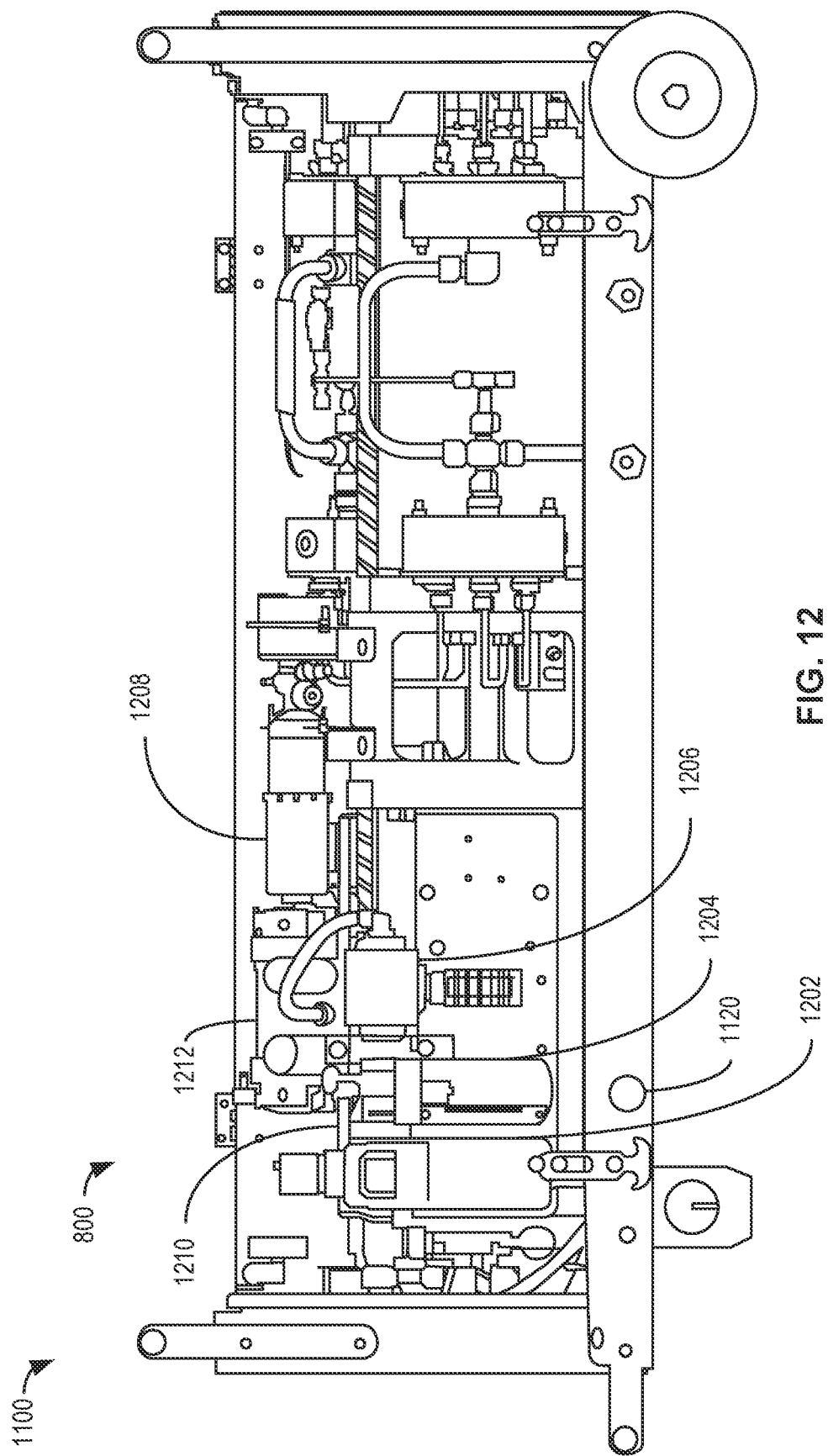
FIG. 12 is a cross-sectional view of the housing of FIG. 11 taken along line A-A of FIG. 11.

FIG. 12 is a cross-sectional view of the housing 1100 taken along line A-A of FIG. 11. In the illustrated example of FIG. 12, the two-cylinder compressor 800 is implemented inside the housing 1100. In this example, the two-cylinder compressor 800 includes an example air filter 1202 and an example air lubricator 1204 fluidly coupled to the air inlet port 1120. In some examples, air flows from the air inlet port 1120 and through the air filter 1202 and/or the air lubricator 1204, then enters an example air supply valve 1206. In such examples, the air supply valve 1206 directs the air to the air casing 802 of FIG. 8A to control movement of the air piston 830 of FIG. 8B therein. The two-cylinder compressor 800 also includes an example over pressure protection valve 1208. In some examples, the over pressure protection valve 1208 can open in response to the air exceeding a threshold pressure (e.g., 140 psig), thus reducing and/or otherwise preventing damage to downstream components of the two-cylinder compressor 800. In this example, the two-cylinder compressor 800 further includes an example air reciprocator (e.g., an air motor) 1210 and an example air directional control valve 1212 to direct the air from the air inlet port 1120 to alternating sides of the air piston 830, thus causing reciprocating travel of the air piston 830 within the air casing 802.

Figure 13:
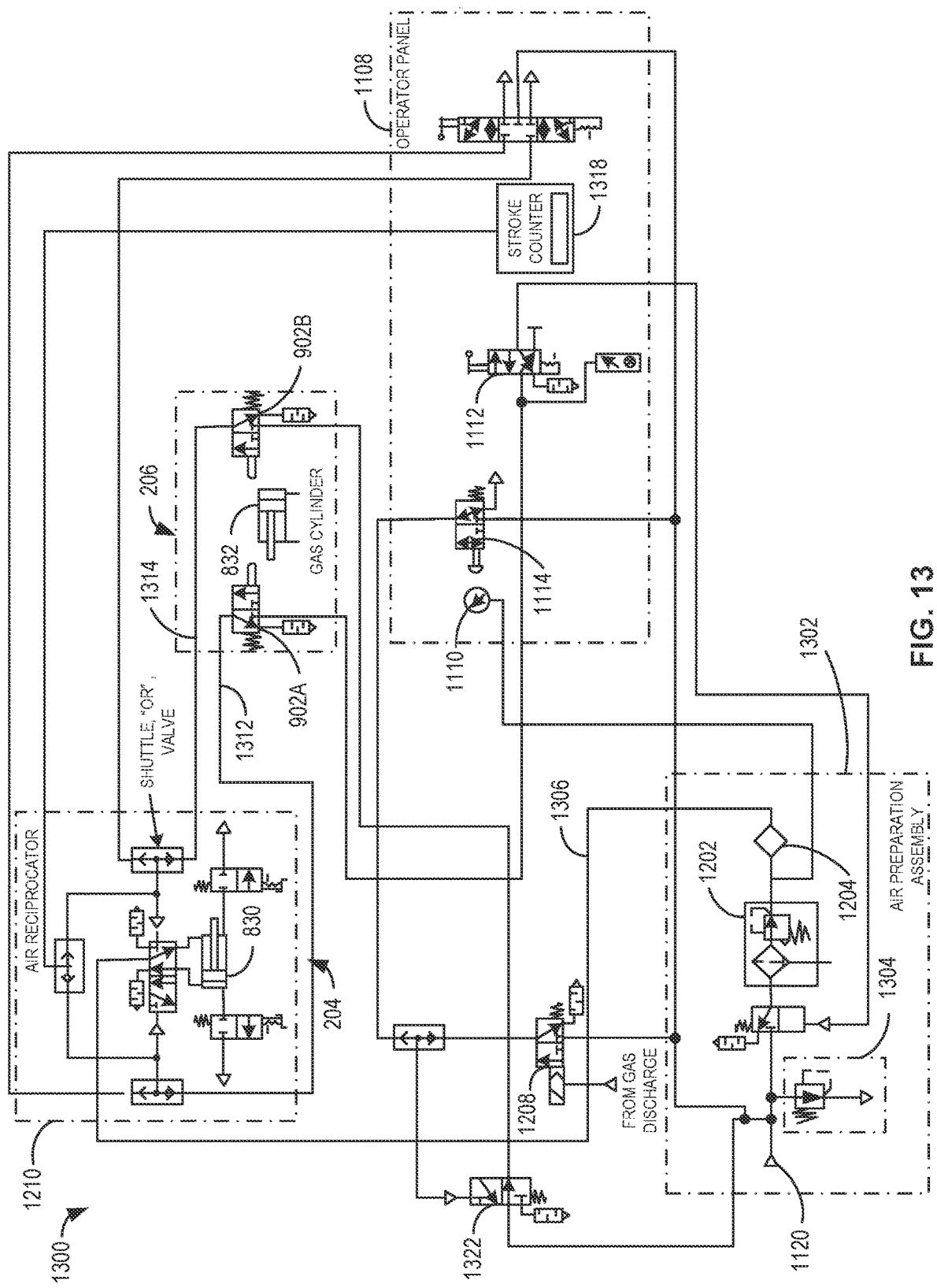
FIG. 13 is a schematic diagram of an example pneumatic system implemented in the example single-tube compressor unit of FIG. 2 and/or the example two-cylinder compressor of FIGS. 8A and/or 8B.

FIG. 13 is a schematic diagram of an example pneumatic system 1300 implemented in the example single-tube compressor unit 200 of FIG. 2 and/or the example two-cylinder compressor 800 of FIGS. 8A and/or 8B. In the illustrated example of FIG. 13, the pneumatic system 1300 includes the air reciprocator 1210, the compression cylinder 206, the operator panel 1108, and an example air preparation assembly 1302. In this example, the air preparation assembly 1302 includes the air inlet port 1120, an example pressure relief valve 1304, the air filter 1202, and the air lubricator 1204. The air preparation assembly 1302 filters and/or lubricates air from the air inlet port 1120, and provides the air to the air reciprocator 1210 via a first example supply line 1306.

At the air reciprocator 1210, one or more valves direct the air to the actuation cylinder 204. In some examples, the air reciprocator 1210 alternates flow of the air between a first example line 1308 at a first end of the actuation cylinder 204 and a second example line 1310 at a second end of the actuation cylinder 204. In particular, the air is provided to a first side of the air piston 830 via the first line 1308 and/or to a second side of the air piston 830 via the second line 1310 to cause reciprocating travel of the air piston 830. In some examples, the air reciprocator 1210 controls the flow of air based on example signals 1312, 1314 from the compression cylinder 206. For example, when the gas piston 832 moves to a first position in the compression cylinder 206 to engage the first stroke end switch 902A, the first stroke end switch 902A provides the first signal 1312 to the air reciprocator 1210. In some examples, the air reciprocator 1210 directs air to the first line 1308 in response to receiving the first signal 1312. Alternatively, when the gas piston 832 move to a second position in the compression cylinder 206 to engage the second stroke end switch 902B, the second stroke end switch 902B provides the second signal 1314 to the air reciprocator 1210. In such examples, the air reciprocator 1210 directs air to the second line 1310 in response to receiving the second signal 1314.

In the illustrated example of FIG. 13, the pressure gauge 1110 of the operator panel 1108 measures and/or displays a pressure of the air in the air preparation assembly 1302. Furthermore, an example stroke counter 1318 of the operator panel 1108 is communicatively and/or operatively coupled to the air reciprocator 1210. In this example, the stroke counter 1318 measures and/or displays a number of strokes completed by the air piston 830 and/or the gas piston 832. In some examples, an example stroke override valve 1320 of the operator panel 1108 can be used to manually override and/or control the direction of travel of the air piston 830. An operator can also control (e.g., start or stop) the flow of air through the air preparation assembly using the rotary on/off valve 1112 of the operator panel 1108. In this example, the operator panel 1108 also includes the emergency stop 1114 operatively coupled to an example pneumatic shutoff valve 1322. In some examples, the operator can manually activate the emergency stop 1114 to shut off operation of the pneumatic system 1300 via the pneumatic shutoff valve 1322.

Figure 14:
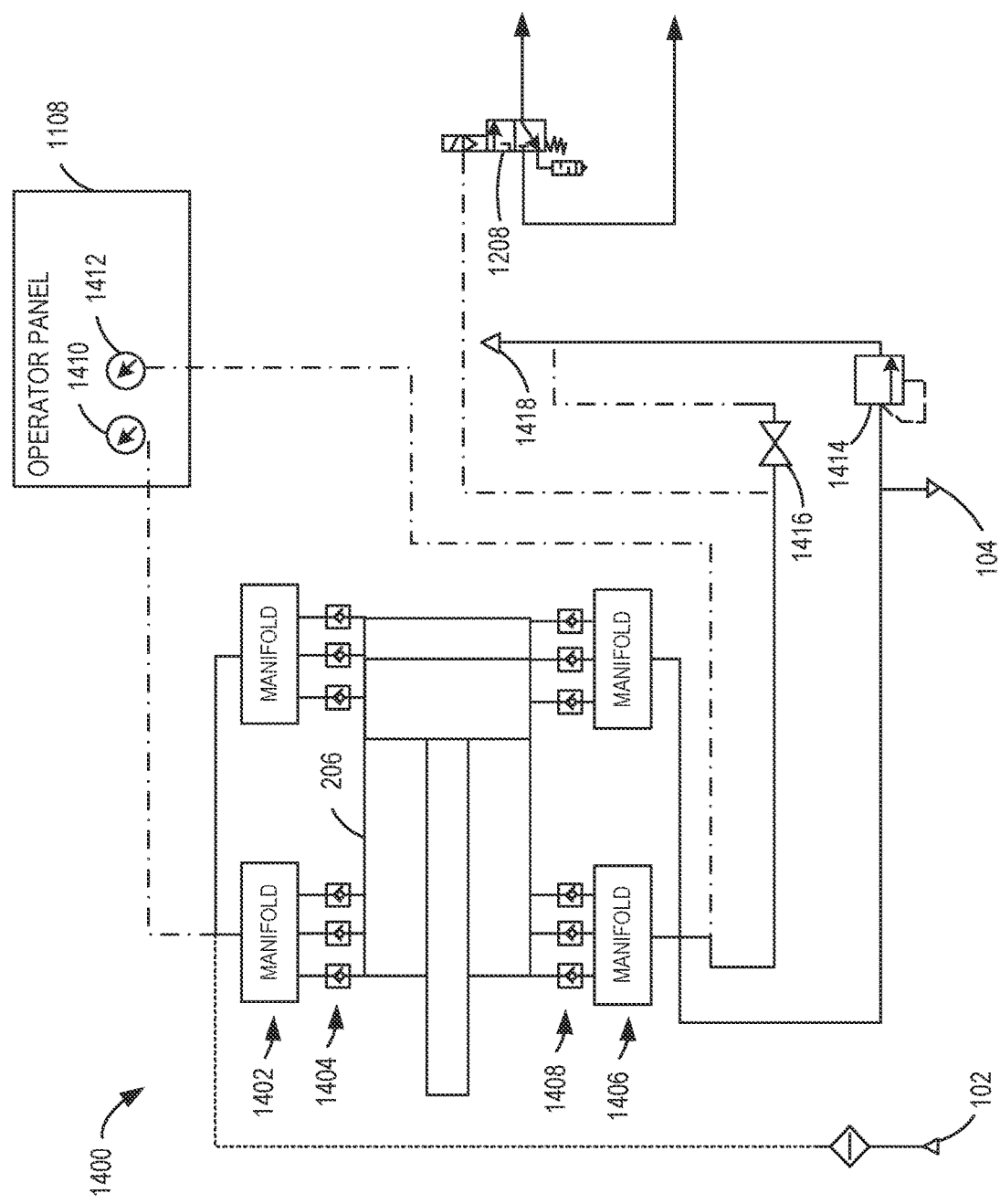
FIG. 14 is a schematic diagram of an example gas system implemented in the example single-tube compressor unit of FIG. 2 and/or the example two-cylinder compressor of FIGS. 8A and/or 8B.

FIG. 14 is a schematic diagram of an example gas system 1400 implemented in the example single-tube compressor unit 200 of FIG. 2 and/or the example two-cylinder compressor 800 of FIGS. 8A and/or 8B. In the illustrated example of FIG. 14, the gas system 1400 controls the flow of gas through the single-tube compressor unit 200 and/or the two-cylinder compressor 800 between the fluid intake 102 and the fluid outlet 104. In this example, gas flows from the fluid intake 102 to the compression cylinder 206 via one or more example inlet manifolds 1402 and one or more example inlet check valves 1404. Furthermore, compressed gas from the compression cylinder 206 flows to fluid outlet 104 via one or more example outlet manifolds 1406 and one or more example outlet check valves 1408.

In the illustrated example of FIG. 14, the operator panel 1108 is fluidly coupled to the gas system 1400 to measure pressure at an inlet and outlet of the compression cylinder 206. For example, the operator panel 1108 includes an example inlet pressure gauge 1410 to measure and/or display an inlet pressure of the gas to the compression cylinder 206, and an example outlet pressure gauge 1412 to measure and/or display an outlet pressure of the gas from the compression cylinder 206. In this example, the gas system 1400 also includes an example relief valve (e.g., pressure relief valve) 1414, an example gas depressurization valve 1416, and an example relief vent 1418 fluidly coupled to the outlet of the compression cylinder 206. In some examples, the relief valve 1414, the gas depressurization valve 1416, and/or the relief vent 1418 reduce a pressure of the gas from the compression cylinder 206. In the illustrated example, the over pressure protection valve 1208 is also fluidly coupled to the outlet of the compression cylinder 206 to prevent excessive pressure in the gas system 1400. In this example, the over pressure protection valve 1208 is activated when the gas at the outlet satisfies a threshold pressure. In some examples, when activated, the over pressure protection valve 1208 causes the pneumatic shutoff valve 1322 of FIG. 13 to shut down and/or otherwise prevent operation of the pneumatic system 1300 of FIG. 13, thus preventing compression of gas in the compression cylinder 206.

From the foregoing, it will be appreciated that example methods, apparatus and articles of manufacture have been disclosed that compress gas between a fluid intake and a fluid discharge. Examples disclosed herein can be used for compressing fluid (e.g., gas) during repair of a pipeline, commissioning of the pipeline, decommissioning of the pipeline, etc. Furthermore, by enabling compression of gas from the pipeline, examples disclosed herein reduce the need for venting of the gas, thus reducing emissions, waste, and/or danger for bystanders. Examples disclosed herein have a compact size that enables efficient transportation of a compressor between one or more locations and/or pipelines. The disclosed methods, apparatus, and articles of manufacture are implemented in a single-tube casing or two casings having configurable length and/or cross-sectional area. Examples disclosed herein can implement a configurable number of compressor units based on a desired flow rate and/or pressure of the gas. Configuration and movement of compressor unit components can occur manually and/or using one or more sensors, actuators, processors, and/or other mechanical, electrical, and/or electromechanical elements to facilitate configuration, movement, change in mode, and other operation of the methods, apparatus, and articles of manufacture disclosed and described herein.

Example 1 includes an apparatus to compress a fluid, the apparatus comprising a casing, an actuation cylinder and a compression cylinder defined in the casing, a rod slidably coupled between the actuation cylinder and the compression cylinder, and a piston coupled to the rod at an end of the rod, the end of the rod in the compression cylinder, the piston slidable relative to the compression cylinder to compress the fluid therein.

Example 2 includes the apparatus of example 1, further including a housing to contain the casing, an operator panel on the housing, the operator panel to include at least one of a pressure gauge, a stroke counter, a stroke override valve, a rotary on/off valve, or an emergency stop.

Example 3 includes the apparatus of example 2, further including wheels coupled to the housing proximate a first end of the housing and a handle coupled to the housing proximate a second end of the housing, the second end opposite the first end, the housing transportable along the wheels.

Example 4 includes the apparatus of example 1, further including one or more cutouts in the casing between the actuation cylinder and the compression cylinder, the one or more cutouts to provide access to at least one of a first inner plate of the actuation cylinder or a second inner plate of the compression cylinder.

Example 5 includes the apparatus of example 1, further including a linear actuator operatively coupled to the rod, the linear actuator to move between a first position and a second position to cause the piston to slide within the compression cylinder.

Example 6 includes the apparatus of example 1, further including an air supply and a control valve operatively coupled between the air supply and the actuation cylinder, the control valve to direct air from the air supply to the actuation cylinder, the air to cause movement of the piston in the compression cylinder.

Example 7 includes the apparatus of example 6, further including a first stroke end switch at a first end of the compression cylinder and a second stroke end switch at a second end of the compression cylinder, the piston to actuate the first and second stroke end switches to switch the control valve between a first state and a second state.

Example 8 includes an apparatus to compress fluid, the apparatus comprising a first casing to define an actuation cylinder, a second casing to define a compression cylinder, a rod slidably coupled between the actuation cylinder and the compression cylinder, and a piston coupled to the rod at an end of the rod, the end of the rod in the compression cylinder, the piston slidable relative to the compression cylinder to compress the fluid therein.

Example 9 includes the apparatus of example 8, further including first threaded rods to removably couple the first casing between a first inner end plate and a first outer end plate, and second threaded rods to removably couple the second casing between a second inner end plate and a second outer end plate.

Example 10 includes the apparatus of example 9, further including a ring coupled between the first and second inner end plates, the ring to include one or more cutouts.

Example 11 includes the apparatus of example 8, further including a housing to contain the first casing and the second casing, an operator panel on the housing, the operator panel to include at least one of a pressure gauge, a stroke counter, a stroke override valve, a rotary on/off valve, or an emergency stop.

Example 12 includes the apparatus of example 11, further including wheels coupled to the housing proximate a first end of the housing and a handle coupled to the housing proximate a second end of the housing, the second end opposite the first end, the housing transportable along the wheels.

Example 13 includes the apparatus of example 8, further including an air supply and a control valve operatively coupled between the air supply and the actuation cylinder, the control valve to direct air from the air supply to the actuation cylinder, the air to cause movement of the piston in the compression cylinder.

Example 14 includes the apparatus of example 13, further including a first stroke end switch at a first end of the compression cylinder and a second stroke end switch at a second end of the compression cylinder, the piston to actuate the first and second stroke end switches to switch the control valve between a first state and a second state.

Example 15 includes a method comprising coupling a first inner end plate and a first outer end plate to a first casing, the first casing to define an actuation cylinder, coupling a second inner end plate and a second outer end plate to a second casing, the second casing to define a compression cylinder, slidably coupling a rod in the actuation cylinder and the compression cylinder, coupling a first piston at a first end of the rod, the first end in the actuation cylinder, and coupling a second piston at a second end of the rod, the second end in the compression cylinder.

Example 16 includes the method of example 15, further including coupling the first inner end plate to the first outer end plate using first threaded rods, and coupling the second inner end plate to the second outer end plate using second threaded rods, the first casing sealably coupled between the first inner and outer plates, the second casing sealably coupled between the second inner and outer plates.

Example 17 includes the method of example 15, further including placing the first casing and a second casing in a housing, an operator panel on the housing, the operator panel to include at least one of a pressure gauge, a stroke counter, a stroke override valve, a rotary on/off valve, or an emergency stop.

Example 18 includes the method of example 17, further including coupling wheels to the housing proximate a first end of the housing and coupling a handle to the housing proximate a second end of the housing, the second end opposite the first end, the housing transportable along the wheels.

Example 19 includes the method of example 15, further including operatively coupling a control valve between an air supply and the actuation cylinder, the control valve to direct air from the air supply to the actuation cylinder, the air to cause movement of the first and second pistons.

Example 20 includes the method of example 19, further including coupling a first stroke end switch to a first end of the compression cylinder and coupling a second stroke end switch to a second end of the compression cylinder, the second piston to actuate the first and second stroke end switches to switch the control valve between a first state and a second state.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

The following claims are hereby incorporated into this Detailed Description by this reference, with each claim standing on its own as a separate embodiment of the present disclosure.

What is claimed is:

1. An apparatus to compress a fluid, the apparatus comprising:
   a casing;
   an actuation cylinder and a compression cylinder defined in the casing, the actuation cylinder removably coupled between a first inner end plate and a first outer end plate via first threaded rods, the compression cylinder removably coupled between a second inner end plate and a second outer end plate via second threaded rods;
   a ring coupled between the first inner end plate and the second inner end plate, the ring including one or more cutouts;
   a rod slidably coupled between the actuation cylinder and the compression cylinder; and
   a piston coupled to the rod at an end of the rod, the end of the rod in the compression cylinder, the piston slidable relative to the compression cylinder to compress the fluid therein.

2. The apparatus of claim 1, further including a housing to contain the casing, an 2. operator panel on the housing, the operator panel to include at least one of a pressure gauge, a stroke counter, a stroke override valve, a rotary on/off valve, or an emergency stop.

3. The apparatus of claim 2, further including wheels coupled to the housing proximate a first end of the housing and a handle coupled to the housing proximate a second end of the housing, the second end opposite the first end, the housing transportable along the wheels.

4. The apparatus of claim 1, wherein the one or more cutouts provide access to at least one of the first inner end plate or the second inner end plate.

5. The apparatus of claim 1, further including an air supply and a control valve operatively coupled between the air supply and the actuation cylinder, the control valve to direct air from the air supply to the actuation cylinder, the air to cause movement of the piston in the compression cylinder.

6. The apparatus of claim 5, further including a first stroke end switch at a first end of the compression cylinder and a second stroke end switch at a second end of the compression cylinder, the piston to actuate the first and second stroke end switches to switch the control valve between a first state and a second state.

7. An apparatus to compress a fluid, the apparatus comprising:
   a first casing to define an actuation cylinder;
   a second casing to define a compression cylinder;
   first threaded rods to removably couple the first casing between a first inner end plate and a first outer end plate;
   second threaded rods to removably couple the second casing between a second inner end plate and a second outer end plate;
   a ring coupled between the first and second inner end plates, the ring including one or more cutouts;
   a rod slidably coupled between the actuation cylinder and the compression cylinder; and
   a piston coupled to the rod at an end of the rod, the end of the rod in the compression cylinder, the piston slidable relative to the compression cylinder to compress the fluid therein.

8. The apparatus of claim 7, further including a housing to contain the first casing and the second casing, an operator panel on the housing, the operator panel to include at least one of a pressure gauge, a stroke counter, a stroke override valve, a rotary on/off valve, or an emergency stop.

9. The apparatus of claim 8, further including wheels coupled to the housing proximate a first end of the housing and a handle coupled to the housing proximate a second end of the housing, the second end opposite the first end, the housing transportable along the wheels.

10. The apparatus of claim 7, further including an air supply and a control valve operatively coupled between the air supply and the actuation cylinder, the control valve to direct air from the air supply to the actuation cylinder, the air to cause movement of the piston in the compression cylinder.

11. The apparatus of claim 10, further including a first stroke end switch at a first end of the compression cylinder and a second stroke end switch at a second end of the compression cylinder, the piston to actuate the first and second stroke end switches to switch the control valve between a first state and a second state.

12. A method comprising:
coupling a first inner end plate and a first outer end plate to a first casing via first threaded rods, the first casing to define an actuation cylinder;
coupling a second inner end plate and a second outer end plate to a second casing via second threaded rods, the second casing to define a compression cylinder;
coupling a ring between the first inner end plate and the second inner end plate, the ring including one or more cutouts;
slidably coupling a rod in the actuation cylinder and the compression cylinder;
coupling a first piston at a first end of the rod, the first end in the actuation cylinder; and
coupling a second piston at a second end of the rod, the second end in the compression cylinder.

13. The method of claim 12, wherein the first threaded rods extend between the first inner end plate and the first outer end plate and the second threaded rods extend between the second inner end plate and the second outer end plate, the first casing sealably coupled between the first inner end plate and the first outer end plate, the second casing sealably coupled between the second inner end plate and the second outer end plate.

14. The method of claim 12, further including placing the first casing and the second casing in a housing, an operator panel on the housing, the operator panel to include at least one of a pressure gauge, a stroke counter, a stroke override valve, a rotary on/off valve, or an emergency stop.

15. The method of claim 14, further including coupling wheels to the housing proximate a first end of the housing and coupling a handle to the housing proximate a second end of the housing, the second end opposite the first end, the housing transportable along the wheels.

16. The method of claim 12, further including operatively coupling a control valve between an air supply and the actuation cylinder, the control valve to direct air from the air supply to the actuation cylinder, the air to cause movement of the first and second pistons.

17. The method of claim 16, further including coupling a first stroke end switch to a first end of the compression cylinder and coupling a second stroke end switch to a second end of the compression cylinder, the second piston to actuate the first and second stroke end switches to switch the control valve between a first state and a second state.

* * * * *

UNITED STATES PATENT AND TRADEMARK OFFICE
CERTIFICATE OF CORRECTION

PATENT NO. : 12,448,960 B2  
APPLICATION NO. : 18/254557  
DATED : October 21, 2025  
INVENTOR(S) : Sahm et al.

Page 1 of 1

It is certified that error appears in the above-identified patent and that said Letters Patent is hereby corrected as shown below:

In the Claims

Column 18, Claim 2, Line 11, Delete: "2."

Signed and Sealed this  
Third Day of February, 2026

John A. Squires  
*Director of the United States Patent and Trademark Office*